United States Patent [19]

Carrazzone et al.

[11] Patent Number: 5,583,825
[45] Date of Patent: Dec. 10, 1996

[54] METHOD FOR DERIVING RESERVOIR LITHOLOGY AND FLUID CONTENT FROM PRE-STACK INVERSION OF SEISMIC DATA

[75] Inventors: James J. Carrazzone; David Chang, both of Houston; Catherine Lewis, Bellaire; Pravin M. Shah; David Y. Wang, both of Houston, all of Tex.

[73] Assignee: Exxon Production Research Company, Houston, Tex.

[21] Appl. No.: 300,661

[22] Filed: Sep. 2, 1994

[51] Int. Cl.⁶ ........................................................ G01V 1/00
[52] U.S. Cl. ............................... 367/31; 367/83; 304/421; 304/422
[58] Field of Search ................................. 367/25, 31, 83; 364/421, 422

[56] References Cited

U.S. PATENT DOCUMENTS

| | | | |
|---|---|---|---|
| 4,210,968 | 7/1980 | Lindseth | 367/46 |
| 4,236,233 | 11/1980 | Davis, Jr. et al. | 367/71 |
| 4,488,270 | 12/1984 | Ruehle | 367/73 |
| 4,495,604 | 1/1985 | Dumanoir | 367/25 |
| 4,791,618 | 12/1988 | Pruchnik | 367/25 |
| 4,817,060 | 3/1989 | Smith | 367/52 |
| 4,858,200 | 8/1989 | Goins | 367/75 |
| 4,858,201 | 8/1989 | Goins et al. | 367/75 |
| 4,858,202 | 8/1989 | Fitch et al. | 367/75 |
| 4,964,096 | 10/1990 | Ruckgaber | 367/70 |
| 4,967,401 | 10/1990 | Barney | 367/46 |
| 4,972,384 | 11/1990 | Williams | 364/421 |
| 4,984,220 | 1/1991 | Bodine et al. | 367/68 |
| 4,995,007 | 2/1991 | Corcoran et al. | 367/52 |
| 5,001,677 | 3/1991 | Masters | 367/68 |
| 5,047,991 | 9/1991 | Hsu | 367/25 |
| 5,282,133 | 1/1994 | Watson | 364/422 |
| 5,392,255 | 2/1995 | LeBras et al. | 364/421 |
| 5,414,674 | 5/1975 | Lichman | 364/421 |
| 5,440,525 | 8/1995 | Dey-Sarkar et al. | 364/421 |

OTHER PUBLICATIONS

Debski, W. and Tarantola, A., "Information on elastic parameters from the amplitudes of reflected waves," Geophysics, v. 60, No. 5, pp. 1426–1436, Sep. 1995.

Backus, M. M., "Basic considerations for fluid anomaly seismic signal detection, and mapping reservoir changes, using 3D seismic data," presented at the 1994 Summer Research Workshop of the Society of Exploration Geophysicists, Stanford University, Aug. 9–11, 1994.

Beylkin, G., "Imaging of discontinuities in the inverse scattering problem by inversion of a causal generalized Radon transform," J. Math. Phys., v. 26, pp. 99–108, 1985.

Beylkin, G., Discrete Radon Transform, IEEE Transactions on Acoustics, Speech, and Signal Processing, v. 35, pp. 162–172, 1987.

Bortfield, R., "Approximation to the reflection and transmission coefficients of plane longitudinal and transverse waves," Geophysical Prospecting, v. 9, pp. 485–502, 1961.

(List continued on next page.)

Primary Examiner—Michael J. Carone
Assistant Examiner—Theresa M. Wesson
Attorney, Agent, or Firm—Keith A. Bell

[57] ABSTRACT

A method for deriving reservoir lithology and fluid content for a target location from pre-stack seismic reflection data. The method uses inversion of pre-stack seismic reflection data for both the target location and a calibration location having known subsurface lithology and fluid content to derive the subsurface lithology and fluid content at the target location. The inversion process is preferably a viscoelastic inversion to account for the effects of friction on seismic wave propagation. The results of the inversion process are a set of subsurface elastic parameters for both the target and calibration locations. Relative magnitudes of these subsurface elastic parameters are compared, together with the known subsurface lithology and fluid content at the calibration location, to derive the subsurface lithology and fluid content at the target location.

35 Claims, 14 Drawing Sheets

OTHER PUBLICATIONS

Castagna et al., "Relationship between compressional–wave and shear–wave velocities in clastic silicate rocks," *Geophysics*, v. 50, pp. 571–581, 1985.

Gassmann, "Elastic waves through a packing of spheres," *Geophysics*, v. 16, pp. 673–685, 1951.

Helgesen, J. and Landrø, M., "Estimation of elastic parameters from AVO effects in the tau–pdomain," *Geophysical Prospecting*, v. 41, pp. 341–366, 1993.

Kormendi, F. and Dietrich, M., "Nonlinear waveform inversion of plane–wave seismograms in stratified elastic media," *Geophysics*, v. 56, No. 5, pp. 664–674, 1991.

Martinez, R. D. and McMechan, G. A., "τ–ρ seismic data for viscoelastic media—part 1: modelling and part 2: linearized inversion," *Geophysical Prospecting*, v. 39, pp. 141–181, 1991.

Minkoff, S. E., and Symes, W. W., "Stimultaneous Determination of the Source–Time Function and Reflectivity via Inversion," expanded abstract and oral presentation materials, presented at the 63rd Annual Meeting and International Exhibition of the Society of Exploration Geophysicists, Washington, D. C., Sep. 26–30, 1993.

Ostrander, W. J. "Plane–wave reflection coefficients for gas sands at nonnormal angles of incidence," *Geophysics*, v. 49, pp. 1637–1648, 1984.

Pan, G. S., Young, C. Y. and Castagna, J. P., "Net Pay Delineation of Gas Sand Using Integrated Target–Oriented Prestack Elastic Waveform Inversion," presented at the 63rd Annual Meeting and International Exhibition of the Society of Exploration Geophysicists, Washington, D.C., Sep. 26–30, 1993.

Richards, P. G. and Frasier, C. W., "Scattering of elastic waves from depth–dependent inhomogeneities," *Geophysics*, v. 41, No. 3, pp. 441–458, 1976.

Rutherford, S. R. and Williams, R. H., "Amplitude–versus–offset variations in gas sands," *Geophysics*, v. 54, pp. 680–688, 1989.

Schultz, P. S. "A method for direct estimation of interval velocities," *Geophyiscs*, v. 47, pp. 1657–1671, 1982.

Smith G. C. and Gidlow, P. M., "Weighted stacking for rock property estimation and detection of gas," *Geophysical Prospecting*, v. 35, pp. 993–1014, 1987.

Symes, W. W., *DSO User Manual and Reference Guide*, Version 1.1, Jun. 1993, The Rice Inversion Project, Department of Computational and Applied Mathematics, Rice University, Houston, Texas.

Symes, W. W. and Carazzone, J. J., "Velocity inversion by differential semblance optimization," *Geophysics*, v. 56, pp. 654–663, 1991.

Symes, W. W. and Carazzone, J. J., "Velocity Inversion by Coherency Optimization," (proceedings of the Geophysical Inversion Workshop, Sep. 27–29, 1989, Houston, Tx.) published in *Geophysical Inversion*, edited by J. Bee Bednar, Society for Industrial and Applied Mathematics, Philadelphia, Pa., 1992.

Tarantola, A. and Valette, B., "Generalized nonlinear inverse problems solved using the least squares criterion," *Reviews of Geophysics and Space Physics*, v. 20, No. 2, pp. 219–232, 1982.

Treitel, S., Gutowski, P. R., and Wagner, D. E., "Plane–wave decomposition of seismograms," *Geophysics*, v. 47, No. 10, pp. 1375–1401, 1982.

Yilmaz, O., *Seismic Data Processing*, Chapters 4 and 7, pp. 241–353 and 428–453, published by the Society of Exploration Geophyicists, Tulsa, Oklahoma, 1987.

METHOD FOR DERIVING RESERVOIR LITHOLOGY AND FLUID CONTENT FROM PRE-STACK INVERSION OF SEISMIC DATA

FIELD OF THE INVENTION

This invention relates generally to the field of seismic prospecting and, more particularly, to a method for deriving reservoir lithology and fluid content from pre-stack inversion of seismic data.

BACKGROUND OF THE INVENTION

In the oil and gas industry, seismic prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different elastic properties). The reflections are recorded by seismic detectors located at or near the surface of the earth, in a body of water, or at known depths in boreholes, and the resulting seismic data may be processed to yield information relating to the geologic structure and properties of the subsurface formations.

The goal of all seismic data processing is to extract from the data as much information as possible regarding the subsurface formations. Data processing techniques have been developed which typically permit the geologic structure of the subsurface formations to be determined with a great deal of accuracy. However, to date, efforts to develop techniques for deriving the geologic properties of the subsurface formations have met with only limited success. Obviously, knowledge of these subsurface geologic properties would be highly valuable in deciding whether or not to drill a well at a particular location.

It is well known by persons skilled in the art of seismic prospecting that the presence of hydrocarbon accumulations in a subsurface formation can have a significant effect on the velocity of propagation of compressional waves (P-waves) through that formation. This effect is the basis of the so-called "bright spot" phenomenon in which an anomalously high reflection amplitude on a seismic section is an indication of the presence of hydrocarbon accumulations, particularly natural gas, in the formation. Unfortunately, the bright spot phenomenon is susceptible to error because many seismic amplitude anomalies are not caused by hydrocarbon accumulations, or they are caused by hydrocarbon accumulations which are low in total saturation and often non-commercial. For this reason, wells drilled on such bright spots often encounter either no reservoir sands at all (and, therefore, no hydrocarbons), or if the sands are present, no hydrocarbons or only low saturations of hydrocarbons. Thus, there is a need for a technique that can be used to discriminate between reservoir sands and other lithologies (e.g., coal or shale) and between low saturation and full saturation of hydrocarbons.

One technique which may be useful for this purpose is amplitude variation with offset ("AVO") analysis. In AVO analysis, measurements of P-wave reflection amplitudes with different angles of incidence are used to attempt to determine compressional wave (P-wave) velocity, shear wave (S-wave) velocity, density, and Poisson's ratio for each subsurface layer suspected of containing natural gas. Knowledge of these subsurface elastic properties can be used to predict whether or not natural gas accumulations are present. See e.g., Ostrander, W. J., "Plane-wave reflection coefficients for gas sands at nonnormal angles of incidence," *Geophysics*, v. 49, pp. 1637–1648, 1984, for a discussion of AVO analysis. Ostrander proposes a method for using AVO analysis to distinguish between gas-related amplitude anomalies and non-gas-related amplitude anomalies. However, Ostrander admits that distinguishing between low gas saturation and full saturation can be very difficult.

AVO techniques have been the subject of a number of prior patents. For example, U.S. Pat. No. 4,858,200 ("Goins") discloses a method for determining the presence of hydrocarbons in subsurface geological formations by comparative assessment of P-wave and S-wave reflection data. The S-wave reflection data is estimated from the P-wave data using variations in the amplitude of the gathered P-wave data with source-receiver offset. Two related patents, U.S. Pat. Nos. 4,858,201 ("Goins et al.") and 4,858,202 ("Fitch et al.") describe two different methods which can be used for obtaining S-wave data from common depth point gathered P-wave traces.

U.S. Pat. No. 4,817,060 ("Smith") discloses a process for directly detecting the presence of hydrocarbons from seismic data. First, the P-wave and S-wave reflectivities are extracted from the data on a trace-by-trace basis. The P-wave reflectivity is then determined as a function of the S-wave reflectivity and the result is subtracted from the extracted P-wave reflectivity to define a fluid factor which is indicative of the presence of hydrocarbons.

U.S. Pat. No. 5,001,677 ("Masters") discloses methods for processing and displaying seismic data to emphasize potential hydrocarbon bearing strata. These methods treat measured attributes from the seismic data as components of a vector, estimate a background vector which represents uninteresting geologic behavior, and then form at least one new attribute which quantifies departures from this uninteresting behavior.

The end products of these prior art AVO processes usually are predictions of the P-wave and S-wave reflectivities for the target location. Although some of these prior processes have recognized the desirability of also determining the density reflectivity (see e.g., the patents to Smith and Masters cited above), none has disclosed a method for successfully doing so.

Another technique which may be useful in discriminating between different lithologies and fluid saturations is pre-stack inversion based on either a one-dimensional (1D) or two-dimensional (2D) model of the earth's subsurface. See e.g., Symes, W. W. and Carazzone, J. J., "Velocity inversion by differential semblance optimization," *Geophysics*, v. 56, pp. 654–663, 1991, and Martinez, R. D. and McMechan, G. A., "τ-p seismic data for viscoelastic media—part 1: modelling," *Geophysical Prospecting*, v. 39, pp. 141–156, 1991.

As will be well known to persons skilled in the art, seismic inversion is a process for deriving a model of the earth's subsurface from seismic reflection data. First, the process attempts to extract information regarding the elastic properties of the subsurface from the data. This information is then used to construct a mathematical or physical model of the earth's subsurface, and synthetic seismograms are generated based on the model. If the synthetic seismograms do not compare favorably to the data, appropriate adjustments are made to the model, and new synthetic seismograms are generated for comparison with the data. This process repeats until the synthetic seismograms generated from the model approximate the actual data. The model is then accepted as accurate.

Pre-stack inversion processes typically attempt to estimate both the background P-wave velocity model and the contrast in various elastic parameters (P-wave velocity, S-wave velocity, and density) and, therefore, are non-linear. Thus, these techniques are extremely complex, and, to date, they have been unsuccessful in deriving subsurface lithologies and fluid contents.

Accordingly, there is a need for a method which can be used to derive subsurface lithologies and fluid content from pre-stack seismic data.

SUMMARY OF THE INVENTION

The present invention is a method for deriving the lithology and fluid content at a subsurface target location from pre-stack seismic reflection data obtained at both the subsurface target location and a subsurface calibration location having known lithology and fluid content. In one embodiment the invention comprises the steps of (a) creating models of the subsurface target and calibration locations; (b) selecting a set of elastic parameters representative of the lithology and fluid content at the subsurface calibration location; (c) performing an inversion of the pre-stack seismic reflection data to determine the selected set of elastic parameters at each of a plurality of points in the models of the subsurface target and calibration locations; (d) comparing relative magnitudes of the elastic parameters for the subsurface target and calibration locations; and (e) using the results of the comparison and the known lithology and fluid content at the subsurface calibration location to derive the lithology and fluid content at the subsurface target location. The elastic parameters are preferably selected from the group consisting of the elastic reflection factors (as hereinafter defined) for P-wave velocity, S-wave velocity, density, P-wave impedance, S-wave impedance, and ratio of P-wave velocity to S-wave velocity. The invention typically also includes a pre-processing phase designed to improve the quality and consistency of the pre-stack seismic data. However, this pre-processing phase may be omitted if the seismic data, as acquired, is suitable for pre-stack inversion.

The inversion process used in the present invention is preferably a viscoelastic inversion so that the effects of frictional attenuation on seismic wave propagation can be taken into account. Where applicable, inversion in the p-τ domain is preferred because of its computational advantages. Comparison of the elastic parameters resulting from the inversion preferably is done by means of ratios of elastic parameters so that the comparison is independent of the original seismic data scaling. These and other features and advantages of the invention will be apparent to persons skilled in the art based on the teachings set forth herein.

BRIEF DESCRIPTION OF THE DRAWINGS

The file of this patent contains at least one drawing executed in color. Copies of this patent with color drawings(s) will be provided by the Patent and Trademark Office upon request and payment of the necessary fee.

The present invention will be better understood by referring to the following detailed description and the attached drawings in which.

Figure 1:
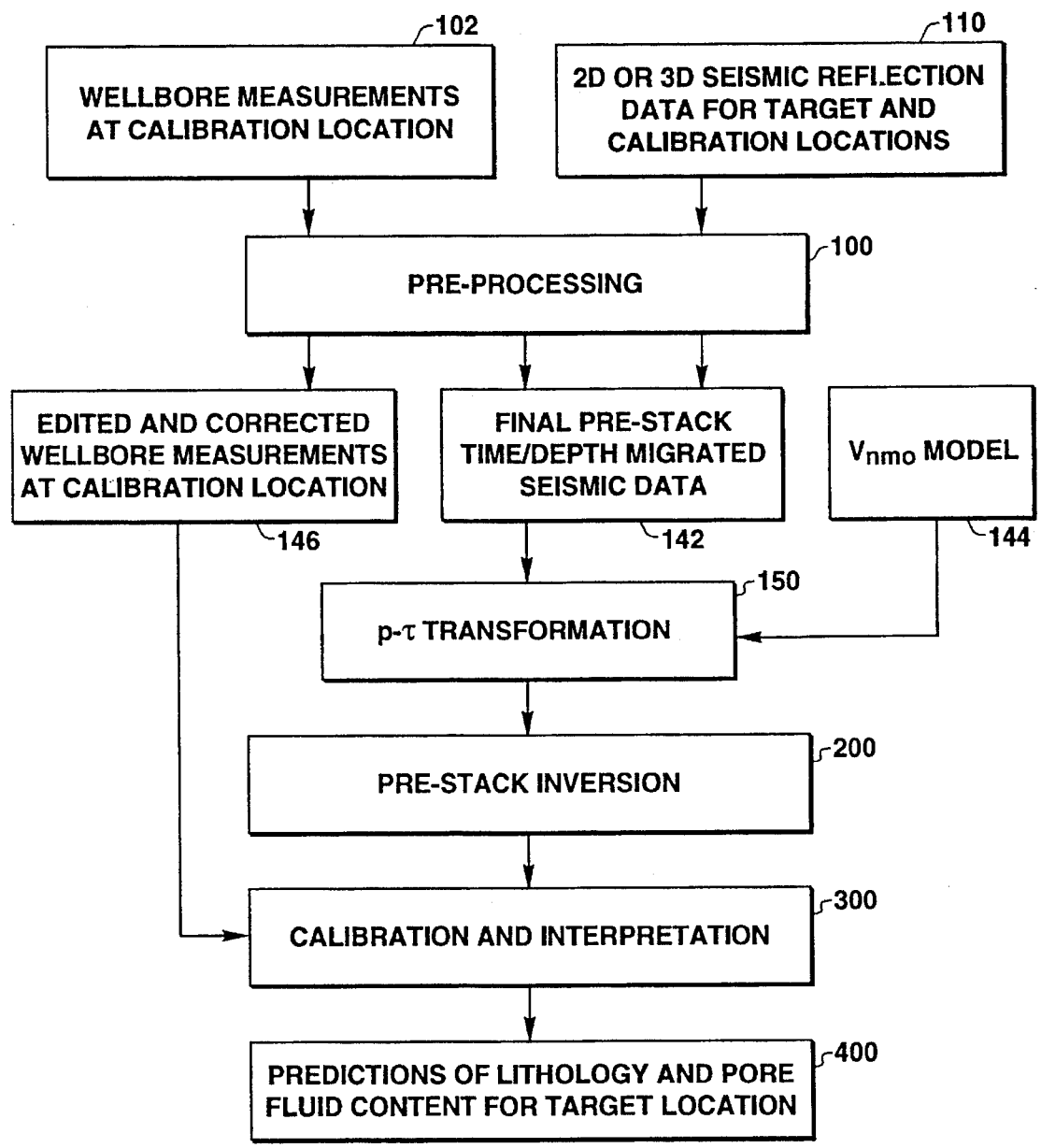
FIG. 1 is a flow chart showing an overview of the preferred embodiment of the invention.

While the invention will be described in connection with its preferred embodiments, it will be understood that the invention is not to be unduly limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The following description makes use of a large number of mathematical symbols, most of which are defined as they occur throughout the text. Additionally, for purposes of completeness, a symbols table containing definitions of symbols used herein is presented following the detailed description.

Overview

The present invention is a method for deriving the lithology and fluid content of subterranean formations. The method uses pre-stack inversion to analyze angle-dependent (also referred to as offset-dependent) seismic amplitude information in pre-stack seismic reflection data. The inversion outputs are used to generate up to six sections (plots of amplitude values versus horizontal location and P-wave vertical arrival time) showing band-limited elastic reflection factors corresponding to P-wave velocity ($R_{vp}$), S-wave velocity ($R_{vs}$), density ($R_{dn}$), P-wave impedance ($R_{zp}$), S-wave impedance ($R_{zs}$), and ratio of P-wave velocity to S-wave velocity ($R_{vp/vs}$). These elastic reflection factors will be defined below in analogy to the normal incident elastic reflection coefficients (for the single interface case) familiar to those skilled in the art. The results of the inversion for the location of interest (i.e., the target location) are then compared with the results of the inversion for one or more calibration locations having known subsurface lithology and fluid content to produce both predictions of the lithology and fluid content at the target location and estimates of the reliability of these predictions.

Preferably, the calibration location is located in the general vicinity of the target location. However, any location having known subsurface lithology and fluid content and a geologic structure and lithologic properties similar to the anticipated geologic structure and lithologic properties of the target location may be used as a calibration location.

The inversion process used in the present invention is preferably a viscoelastic inversion. A viscoelastic inversion employs wave equation models and inversion procedures which (i) account for variations in P-wave velocity, S-wave velocity, and density and (ii) allow for frictional energy losses from propagating P-waves and S-waves via P-wave and S-wave quality factors. The inclusion of P-wave and S-wave quality factors in describing wave propagation means that an exponential loss of energy occurs with respect to both increasing temporal frequency and distance of propagation. The importance of frictional losses varies from location to location, and at any given location its importance increases with target depth. For example, successful application of the present invention to deep targets in the Gulf of Mexico requires that frictional losses be taken into account.

The six reflection factors, $R_{vp}$, $R_{vs}$, $R_{dn}$, $R_{zp}$, $R_{zs}$, and $R_{vp/vs}$, are defined conceptually at the interface of two uniform and semi-infinite elastic materials in welded contact. For example, the reflection factor for P-wave velocity, $R_{vp}$, is defined in this situation by $$R_{vp} = \frac{V_p(L) - V_p(U)}{V_p(L) + V_p(U)} \quad (1)$$

where $V_p(L)$ is the compressional or P-wave velocity in the lower material and $V_p(U)$ is the compressional or P-wave velocity in the upper material. Similarly, the reflection factors for S-wave velocity, $R_{vs}$, and density, $R_{dn}$, are determined using equations which are analogous to equation (1):

$$R_{vs} = \frac{V_s(L) - V_s(U)}{V_s(L) + V_s(U)} \quad (2)$$

$$R_{dn} = \frac{\rho(L) - \rho(U)}{\rho(L) + \rho(U)} \quad (3)$$

where $V_s(L)$ is the shear or S-wave velocity in the lower layer, $V_s(U)$ is the shear or S-wave velocity in the upper layer, $\rho(L)$ is the density in the lower layer, and $\rho(U)$ is the density in the upper layer.

The other three reflection factors, $R_{zp}$, $R_{zs}$, and $R_{vp/vs}$, are derived from the first three. The P-wave impedance, $Z_p$, is defined as $$Z_p = \rho V_p \quad (4)$$

where $\rho$ is density and $V_p$ is compressional or P-wave velocity. The P-wave impedance reflection factor, $R_{zp}$, is then $$R_{zp} = \frac{Z_p(L) - Z_p(U)}{Z_p(L) + Z_p(U)} \quad (5)$$

where $Z_p(L)$ is the P-wave impedance in the lower layer and $Z_p(U)$ is the P-wave impedance in the upper layer. The $R_{zp}$ reflection factor is, in fact, the physical normal incident reflection coefficient for P-wave reflection. Similarly, the S-wave impedance, $Z_s$, is defined as $$Z_s = \rho V_s \quad (6)$$

and the S-wave impedance reflection factor, $R_{zs}$, is $$R_{zs} = \frac{Z_s(L) - Z_s(U)}{Z_s(L) + Z_s(U)} \quad (7)$$

where $\rho$ is density, $V_s$ is shear or S-wave velocity, $Z_s(L)$ is the S-wave impedance in the lower layer, and $Z_s(U)$ is the S-wave impedance in the upper layer. Lastly, the reflection factor for the ratio of P-wave velocity to S-wave velocity, $R_{vp/vs}$, is simply $$R_{vp/vs} = \frac{(V_p(L)/V_s(L)) - (V_p(U)/V_s(U))}{(V_p(L)/V_s(L)) + (V_p(U)/V_s(U))} \quad (8)$$

where $V_p(L)/V_s(L)$ is the ratio of P-wave velocity in the lower layer to S-wave velocity in the lower layer and $V_p(U)/V_s(U)$ is the ratio of P-wave velocity in the upper layer to S-wave velocity in the upper layer.

The single interface concept referred to above, however, is too restrictive with respect to actual subsurface materials where rock properties change continuously. Therefore, it is common practice to define a "reflectivity trace" as a series of reflection factors for each interface of a finely layered earth model convolved with a zero-phase, band-limited pulse of appropriate band width. Thus, the output of the inversion is a set of up to six reflectivity traces for each location of interest. In the case of general earth models which allow for significant reflector dip in two or three dimensions, the layered model concept is generalized to models which have non-layered structure.

Typically, the results of the inversion at both the target and calibration locations are compared by means of ratios of the reflection factors. For example, the ratio of the density reflection factor to the P-wave velocity reflection factor, $R_{dn}/R_{vp}$, can be compared at both the target location and the calibration location, together with knowledge of the actual lithology and fluid content of the subsurface at the calibration location, to yield useful information regarding the lithology and fluid content of the subsurface at the target location. Other ratios which may be useful include, but are not limited to, $R_{vp/vs}/R_{zp}$ and $R_{zs}/R_{vp}$.

The selection of the relevant ratio (or ratios) to be compared in any particular situation depends upon an understanding of the expected hydrocarbon signature. In many situations, the hydrocarbon signature of interest does not involve shear or S-wave velocity contrasts. In this case, the density reflection factor, $R_{dn}$, is equivalent to the S-wave impedance reflection factor, $R_{zs}$. This can be shown by letting $Z_s(L) = \rho(L)V_s(L)$ and $Z_s(U) = \rho(U)V_s(U)$ in equation (7), $$R_{zs} = \frac{\rho(L)V_s(L) - \rho(U)V_s(U)}{\rho(L)V_s(L) + \rho(U)V_s(U)}, \quad (7b)$$

and then assuming that $V_s(L) = V_s(U)$ (i.e., no S-wave velocity contrast) so that equation (7b) reduces to $$R_{zs} = \frac{\rho(L) - \rho(U)}{\rho(L) + \rho(U)} = R_{dn} \quad (7c)$$

Thus, where no shear or S-wave velocity contrasts are involved, the density reflection factor can be determined from the change in S-wave impedance. Under some circumstances, the change in S-wave impedance may be easier to extract from seismic data than the change in density.

The use of ratios of inversion outputs in the present invention is both new and important. This idea is important because it allows inversion outputs to be compared in a way which makes them predictive. Part of the predictive value of these ratios comes from the fact that the use of ratios removes any dependence on the scaling of the seismic data due to differences in source strengths or transmission effects between the calibration and target locations. Furthermore, the average values and variances of these ratios contribute directly to an accumulating data base which, after suitable correction for geologic environment, can be presented as a table of calibrations and predictions. This data base can be used for predictions of lithology and fluid content in situations where a suitable calibration well is not available.

Historically, pre-stack inversion schemes have had little success in hydrocarbon exploration because they have not displayed predictive capabilities. There are a variety of reasons for this. For example, prior inversion schemes typically have failed to adequately account for all of the significant factors affecting the amplitude and traveltime of seismic data. Further, these prior inversion schemes typically have used inversion procedures which are less robust than the inversion scheme used in the present invention and have failed to properly normalize the inversion results.

These problems have been overcome by the present invention which shows explicitly how to use pre-stack inversion of seismic data to directly predict natural gas and perhaps oil saturation, at least under favorable conditions. Favorable conditions include:

1. Broad range of useful reflection angles or offsets at target locations;
2. Little interference from multiple reflections;
3. Small lateral variations in the strength of the seismic signal incident on the target;
4. Small variations in the source and receiver coupling;
5. Low reflector dips between source, reflection points of interest, and detectors;
6. Broad range of useful frequency content (i.e., high signal-to-noise ratio);
7. Good spatial sampling in offset and midpoint domains;
8. Consistent lithologic properties at calibration and target locations; and
9. Sufficient target thickness.

A broad range of useful signal frequencies is necessary because the seismic data must contain sufficient temporal information to resolve changes in the subsurface velocities and densities on a scale useful to hydrocarbon exploration. Seismic resolution is defined as the ability to discriminate between two features.

The present inventive process can be broadly considered to have three phases: a pre-processing phase; a pre-stack inversion phase; and a calibration and interpretation phase. The pre-stack inversion phase of the invention is preferably performed in either the offset-time (x-t) domain or the slowness-intercept time (p-$\tau$) domain; however, any other domain may be used if desired. As will be well known to persons skilled in the art, in cases where it is applicable, processing in the p-$\tau$ domain has certain computational advantages. Generally, p-$\tau$ inversion is applicable to the low dip case (i.e., dips less than about 10°) where 1D modeling (i.e., an earth model of plane parallel layers) can be applied. The following description will be centered on this case, which will be hereafter referred to as the preferred embodiment, and comments on other embodiments (e.g., inversion in the x-t domain and extensions to high dip, structured geologic situations) will be made as necessary.

In general, the nature of the geologic structure of the target and its overburden will determine the type of seismic data needed and the choice of inversion method. A single dip line (2D) can be used for analyzing a 2D subsurface. A 3D seismic survey is needed to work with complex 3D subsurface structures. The in-line and cross-line spacings used in the survey will limit the resolution attainable from the inversion process.

It should be noted that, as of the filing date hereof, successful applications of the present invention have been limited to the preferred embodiment (low dip and inversion in the p-$\tau$ domain) because of the enormous computational demands of the high dip case. Further, these successful applications of the invention have generally involved offshore locations because marine seismic data is normally of higher quality than on-land data. Nevertheless, the present invention is equally applicable to on-land locations and to more complex embodiments. With the use of multi-component seismic measurements, the invention can be extended to include mode-converted reflections. For example, in on-land applications, the invention can be used with seismic data collected using S-wave seismic sources, as well as P-wave sources. As more powerful computers become available, persons skilled in the art will be able to successfully apply the present invention to on-land data and to more complex embodiments based on the teachings set forth herein. Accordingly, to the extent that the following description is specific to a particular embodiment or a particular use of the invention, this is intended to be illustrative only and is not to be construed as limiting the scope of the invention.

FIG. 1 is a flow chart showing an overview of the preferred embodiment of the invention. The pre-processing phase (reference numeral 100) typically requires two different types of input measurements: wellbore measurements of $V_p$, $V_s$, and $\rho$ at the calibration location (reference numeral 102) and 2D or 3D pre-stack seismic reflection data for both the target and calibration locations (reference numeral 110), and results in three outputs: final pre-stack time or depth migrated seismic data for both the target and calibration locations (reference numeral 142); a normal moveout velocity model for both the target and calibration locations (reference numeral 144); and edited and corrected wellbore measurements at the calibration location (reference numeral 146). The migrated seismic data and moveout velocity model are used as inputs to the p-$\tau$ transformation (reference numeral 150), and the transformed data are input to the pre-stack inversion phase (reference numeral 200) of the invention. The edited and corrected wellbore measurements and the results of the pre-stack inversion are used in the calibration and interpretation phase (reference numeral 300). The results of this process are predictions of the lithology and fluid content at the target location (reference numeral 400).

Persons skilled in the art will readily understand that the present invention is computationally intense. Accordingly, use of a computer, preferably a high speed digital computer, to practice the invention is virtually a necessity. Computer software for various portions of the present invention (e.g., the pre-stack time or depth migration or the p-$\tau$ transformation) is commercially available. Computer software for other portions of the invention could readily be developed by persons skilled in the art based on the teachings set forth herein.

The Pre-processing Phase

Figure 2:
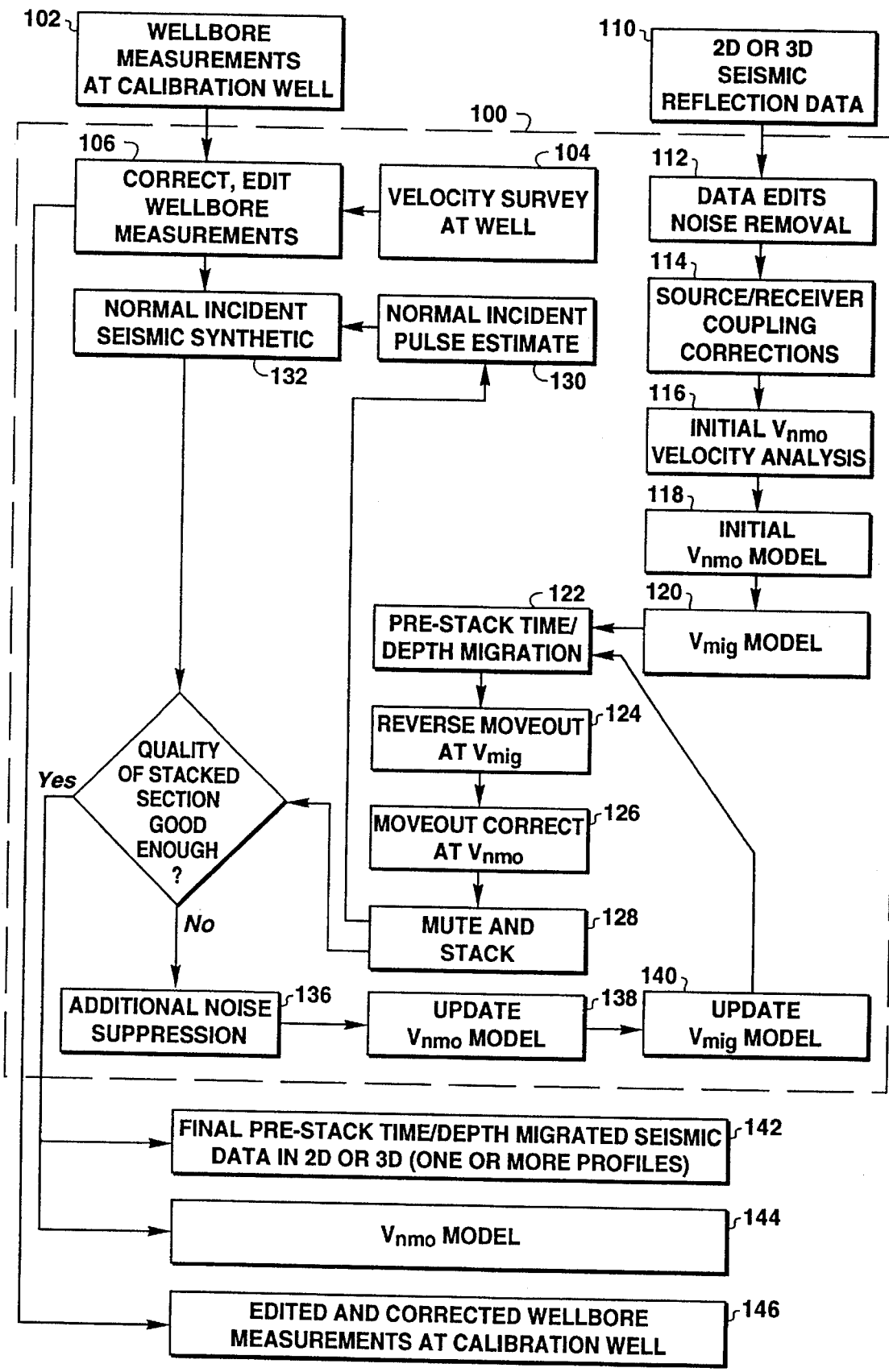
FIG. 2 is a flow chart showing the various steps used in the preferred embodiment of the pre-processing phase of the invention.

The primary purposes of the pre-processing phase are to prepare the seismic reflection data for the pre-stack inversion phase and to determine, as well as possible, the actual lithology and fluid content of the subsurface at the calibration site for use in the calibration and interpretation phase. A flow chart for the preferred embodiment of the pre-processing phase is shown in FIG. 2. As noted above, two different types of input measurements are typically required: wellbore measurements of $V_p$, $V_s$, and $\rho$ at the calibration location (reference numeral 102) and 2D or 3D seismic reflection data for both the target and calibration locations (reference numeral 110).

Turning first to the wellbore measurements at the calibration location, these measurements must provide an adequate basis for analysis of the seismic reflection data at the calibration location and must provide a basis for understanding the expected hydrocarbon signature. Typical well measurements will consist of information collected by a number of well-logging tools which can be used by those skilled in the art of log interpretation to obtain reliable estimates of P-wave velocity and density at intervals appropriate to the logging tools employed. These intervals can be as small as one-half foot over the logged depth interval. Rock core samples can be used to confirm or correct log measurements. In order to apply 1D modeling (i.e., an earth model of plane parallel layers) to the well measurements, it is necessary that the well measurements cover not only the depth locations containing hydrocarbons, but also depth intervals above the zone of interest. In many situations this means that several thousand feet of wellbore must be logged.

Modeling of the expected seismic response based on wellbore measurements and comparison to the actual seismic reflection data at the well location can be used to help determine the P-wave quality factor, as more fully described below. Other methods for determination of the P-wave quality factor, such as the use of vertical seismic profile (VSP) measurements, will be well known to persons skilled in the art. Generally, a VSP is a set of seismic traces recorded by detectors (usually hydrophones) located in a wellbore when a seismic source is activated at or near the surface. These traces may be analyzed using known techniques to determine both P-wave transit times from the source to the detectors and P-wave quality factor.

In some situations, the wellbore measurements will be made with logging tools which allow direct estimation of the S-wave velocity. If the S-wave velocity cannot be directly obtained from the well measurements, then the S-wave velocity can often be estimated to sufficient accuracy from the P-wave velocity using the mudrock relation. See, Castagna et al., "Relationship between compressional-wave and shear-wave velocities in clastic silicate rocks," *Geophysics*, v. 50, pp. 571–581, 1985.

In many cases, a velocity survey (reference numeral 104) may also have been conducted at the calibration well. A velocity survey (also known as a "check shot survey") is a type of seismic profile in which the seismic source is located near the wellbore so that nearly vertical raypaths are achieved. First break transit times are recorded at many tens to several hundreds of depth locations running the entire length of the wellbore. Information resulting from a velocity survey can be used to verify or, if necessary, correct the wellbore measurements.

As is well known to persons skilled in the art, wellbore measurements must be correctly evaluated before such measurements can be usefully associated with actual subsurface properties. Well log editing and correction procedures (reference numeral 106) are well established. Sonic log transit times may be incorrect due to cycle skipping caused by borehole washout or gas effect, or due to drilling fluid invasion effects. Wellbore measurements of sonic transit times can be corrected, under appropriate conditions, by application of Gassmann's formulas (see, Gassmann, "Elastic waves through a packing of spheres," *Geophysics*, v. 16, pp. 673–685, 1951, and Gassmann's prior work cited therein) and by making use of velocity surveys and/or vertical seismic profile (VSP) measurements. Wellbore measurements of density are normally corrected for the influence of drilling mud invasion and must be edited for errors due to borehole washout. Sidewall core samples, if collected, can be used to confirm wellbore measurements and their relationship with formation properties.

The second type of input measurements required for the preferred embodiment of the present invention is 2D or 3D seismic reflection data (reference numeral 110). The data must contain useful reflections conveying the necessary angle-dependent information over both the target and calibration locations. This data should conform as nearly as possible with the favorable conditions listed above. Reservoir/target thickness and lateral uniformity are important geologic factors because reservoirs which are not at least one-quarter of the minimum wavelength thick or which lack uniformity are difficult to resolve.

The seismic reflection data may consist of a single seismic reflection profile line (2D data) or several profile lines, usually on a regular grid (3D data). Each seismic reflection profile line consists of perhaps hundreds or even thousands of locations where seismic energy has been generated (e.g., by arrays of air gun detonations). Each seismic source array detonation produces mechanical waves (compressional or P-waves and shear or S-waves) which propagate into the earth. The transmitted and reflected seismic energy from each source detonation is recorded by perhaps hundreds or even thousands of detection devices (e.g., geophones which record the local seismic velocity in one or more directions or hydrophones which record the local changes in hydrostatic pressure). In most cases, source detonations will occur at fixed intervals along or near the profile line called the "shot point interval." The seismic energy associated with the source detonation is typically recorded by arrays of detectors positioned approximately at fixed intervals relative to the source along or near the profile line. The detectors are usually positioned at shot-point to detector locations which range from a few hundred feet to tens of thousands of feet.

The maximum recorded shot point to detector offset, for each reflection point of interest, should significantly exceed the reflector depth so that the data will contain the necessary angle-dependent information. For example, for a target location having a depth of approximately ten thousand feet, maximum shot point to detector offsets of up to twenty thousand feet or even more would be useful. The exact range of recorded offsets useful in a particular situation depends upon the P-wave velocities and noises present in the data. In general, reflection angles of up to 60 degrees are desirable (although difficult to achieve at target depths of interest). In a medium having a uniform seismic velocity, reflection angles of 60 degrees require offsets of approximately 3.5 times the reflector depth. Although seismic velocity typically increases with depth (which reduces the maximum offset needed for 60 degree reflection angles), it is nevertheless difficult to achieve these large reflection angles, particularly for deep targets.

A common artifact of the pre-stack time or depth migration (reference numeral 122) and of the lateral smoothing of the velocity models (reference numerals 116, 118, 120) are "edge" effects. In order to reduce the edge effects on the data in the region of interest, seismic data is typically acquired and processed over a larger region. The additional data (known as "data margins") are usually one-half to one times the maximum shot point to detector offset. For example, in one case the present invention was applied to approximately 12,500 feet of a 2D seismic profile line. The pre-processing phase was applied to an additional 12,300 feet of recorded data on each side for a total of 37,100 feet. This corresponds to a data margin of approximately 0.6 times the maximum offset of approximately 20,000 feet.

In manipulation of seismic data, mathematical processes are frequently applied which impose limitations on the maximum spatial intervals used in the data recording process. These issues, commonly referred to as "aliasing," are well known to persons skilled in the art, and the present invention assumes that spatial sampling conditions have either been met by the data recording procedures or, if spatial sampling conditions are not completely satisfied, sufficient information is present to perform a useful interpolation of the recorded data to fulfill the spatial sampling conditions.

Typically, the seismic reflection data will contain various undesirable noises. As indicated at reference numeral 112, the data should be edited to remove and/or correct these noises. The occurrence and suppression of noises in seismic recordings are well known to persons skilled in the art.

In the case of either land or marine data, variations of the source and/or receiver coupling to the seismic medium along (or among) the line (or lines) of profile will cause serious problems with the pre-stack time or depth migrations and the p-τ transform. Therefore, the pre-processing phase of the invention preferably contains a procedure for source and/or receiver coupling correction (reference numeral 114), as follows:

1. For each source location compute the average absolute amplitude or root-mean-square amplitude of all detector recordings, perhaps in a time window near a target reflection of interest;
2. For each detector channel in the survey (i.e., fixed shot point to detector distance) compute the average absolute amplitude or root-mean-square amplitude, again perhaps in a time window near a reflection of interest;
3. Attribute any rapid systematic variation in these averages to variations in source coupling or to variations in receiver coupling (averaging over the detectors displays variations in source coupling, and averaging over the sources displays variations in detector coupling); and
4. Apply compensating scaling factors to remove (as completely as possible) the observed variations (sources or detectors which require too large a correction may be eliminated, and the missing data is then supplied by interpolation).

Geometric divergence correction may be applied before computation of the averages. As is well known to persons skilled in the art, geometric divergence correction refers to a correction which compensates the recorded seismic data for the expected decrease in reflected amplitude as distance traversed increases.

The next step of the preferred embodiment is to perform an initial normal moveout velocity analysis of the data (reference numeral 116). In areas of low dip (i.e., less than about 10°), and for all dips at small offsets, seismic reflection data displays a pattern of reflection time versus offset which closely follows the well-known normal moveout equation. This equation defines a velocity known as the normal moveout velocity, $V_{nmo}$. The normal moveout velocity plays an important role in seismic data processing. The normal moveout velocity is estimated from the seismic data itself (although the values obtained are expected to be fairly consistent with root-mean-square averages of well measurements). In areas of low dip, the normal moveout velocity corresponds approximately to a running root-mean-square average of the actual P-wave velocity (referred to as the interval velocity). Estimation of the normal moveout velocity from pre-stack seismic reflection data is well known to those skilled in the art. The preferred embodiment assumes that the normal moveout velocity has been estimated to sufficient accuracy to produce an acceptable stack of the major primary reflections between the reflection event or events of interest and the surface source/detection system. Reflection events substantially beneath the reflection events of interest may be ignored.

The normal moveout velocity analysis (reference numeral 116) is usually conducted on only a fraction of the data (e.g., one out of every twenty midpoint locations for typical data acquisition parameters). The information resulting from this process is used to produce a model of $V_{nmo}$ (reference numeral 118) across the seismic profile line or lines of interest. Interpolation procedures in 2D or 3D are then used to produce an estimate of $V_{nmo}$ at all locations of interest in the subsurface, as would be well known to persons skilled in the art.

Prior to actually performing the pre-stack time or depth migration, a migration velocity model must be produced (reference numeral 120). Pre-stack time or depth migration procedures require knowledge of the subsurface P-wave velocity on distance scales appropriate to propagational effects. This approximate velocity is called the background or migration velocity, $V_{mig}$. Conceptually, $V_{mig}$ is a smoothed version of the actual P-wave velocity (usually called the interval velocity, $V_{int}$). The smoothing is an averaging process over a distance of several hundred feet in each direction (e.g., 500 feet). In practice, the actual subsurface velocity, $V_{int}$, is never known and it must be approximated, usually from the $V_{nmo}$ model (reference numeral 118) when time migration is appropriate. The usual procedure is to assume that the $V_{nmo}$ model is a root-mean-square running average of $V_{int}$. This is known as the Dix approximation. In principle, a migration velocity model can be obtained directly from the moveout velocity using a formula derived by Dix. Very often, however, the result, called the Dix velocity, $V_{Dix}$, contains objectionable large variations due to magnifications of errors in $V_{nmo}$.

The preferred method for time migration uses a lateral average of the initial $V_{nmo}$ model, and then a suitably smooth (and laterally constant) $V_{mig}$ model designed to agree with the laterally averaged $V_{nmo}$ model only at certain gridded locations (usually at every 0.200 seconds in two-way traveltime). In other words, the root-mean-square running average of $V_{mig}$ only approximately agrees with a lateral average of $V_{nmo}$ at gridded locations of approximately every 0.200 seconds. Preferably, the agreement is enforced by use of a ray-tracing method.

When depth migration is required, the migration velocity model varies laterally in one or two dimensions (in addition to the vertical variations) depending upon the use of one or more profile lines. Full blown pre-stack ray tracing is required to obtain a migration velocity model which suitably images the target locations of interest. In 2D (i.e., one profile line), commercially available software products (e.g., GeoDepth marketed by Paradigm Geophysical Corporation) which operate on scientific workstations are useful for this purpose. The migration velocity models estimated directly from migration velocity analysis are likely to contain objectionable variations. Lateral smoothing is applied to remove large lateral variations resulting in smooth and more geologically plausible models.

As will be well known to persons skilled in the art, seismic reflection data typically must be corrected by a process known as migration. Two types of migration, time migration and depth migration, are available. Time migration refers to a seismic processing procedure based on the wave equation which is valid when lateral changes in the P-wave velocity may be neglected. When lateral changes in P-wave velocity cannot be disregarded, the more correct (and, consequently, more difficult and more expensive) version of the same procedure is called depth migration. See e.g., Yilmaz, O., *Seismic Data Processing*, Chapter 4, pp. 241–353, published by the Society of Exploration Geophysicists, Tulsa, Okla., 1987 for a discussion of seismic migration and for further details on different migration procedures. Conceptually, the migration process moves data from the recorded spatial position to the position from which the reflections actually originated.

In the preferred embodiment of the present invention, pre-stack time or depth migration (reference numeral 122) is used for at least two purposes: to remove diffraction hyperbolas and to correctly position dipping reflectors. As will be well known to persons skilled in the art, pre-stack time or depth migration suppresses diffraction hyperbolas by contracting them back to a point reflection. Also, in the non-zero dip case, a common mid-surface point gather will contain data from a range of reflection points (known as "reflection-point smear"). The degree of smear increases with reflector dip. Pre-stack time or depth migration can be used to sort the data into true common reflection point gathers. Any of the well-known migration methods (e.g., Kirchoff migration, dip moveout followed by zero-offset migration, etc.) may be used.

Success of the pre-stack inversion process is critically dependent on the proper treatment of seismic reflection amplitudes by the pre-stack time or depth migration. Specifically, the pre-stack time or depth migration process must produce the correct dependence of reflection amplitude upon reflection angle and upon the source to reflection point and reflection point to detector distances. Calibration tests for verifying that the pre-stack migration process is properly treating reflection amplitudes include, but are not limited to:

1. Migration of synthetic data generated with a layered elastic model to confirm preservation of reflection amplitudes when no migration corrections are required. Migration of an acoustic model with a small change in density only is a useful test because the reflection coefficients are independent of angle.
2. Migration of synthetic data generated with a single dipping interface to test correction for reflection-point smear.
3. Migration of actual seismic data to evaluate migration of diffractions and to verify improvements in amplitude information.

The need for an amplitude consistent migration process is well known in the art. The theory is presented in considerable mathematical detail in papers such as Beylkin, G., "Imaging of discontinuities in the inverse scattering problem by inversion of a causal generalized Radon transform," *J. Math. Phys.*, v. 26, pp. 99–108, 1985.

When the invention is extended to the more general situation of geologic structure (which allows for high reflector dips and significant lateral velocity changes), the use of layered earth models and inversion in the p-τ domain is no longer justified. In this situation, the seismic data is inverted using a more general wave equation model which allows for arbitrary earth structure. Accordingly, in this case there is no need for a preliminary time or depth migration (reference numeral 122) intended to improve the consistency between the data and the layered earth model. The inversion process for a general wave equation model can be viewed as containing its own "built-in" depth migration.

Where applicable, pre-stack time migration is preferred over pre-stack depth migration because the time migration process is less sensitive to errors in the migration velocity. For the time migration procedure, a lateral average of the stacking velocity, $V_{nmo}$, suffices. Depth migration, used either as a pre-processing step or as part of the inversion process itself, is very sensitive to the choice of the background P-wave velocity, $V_{mig}$.

The output of the time or depth migration will be either (i) pre-stack seismic data migrated to vertical arrival time in the time migration case or (ii) pre-stack seismic data migrated to its depth location in the depth migration case. In both cases, these results will depend upon the migration velocity model. In general, the migration velocity model will not be perfectly correct, and this will manifest itself by at least a small inconsistency in the zero-offset time or depth location of reflection events migrated from different offsets into (theoretically) the same common depth point gather. Such migrated data is said to display "residual" moveout. This problem is corrected by applying a reverse moveout correction appropriate to $V_{mig}$ (reference numeral 124). The result will be pre-stack seismic data displaying (at least approximately) the normal hyperbolic moveout. In the situation where lateral velocity changes are small and time migration is appropriate, the reverse moveout correction is performed by inverting the familiar normal moveout equation:

$$t(x) = \sqrt{t_0^2 + \frac{x^2}{V_{nmo}^2}} \quad (9)$$

where $t(x)$ is the two-way reflection time at shot-point to detector-point offset x, $t_0$ is the zero-offset reflection time, and $V_{nmo}$ is the normal moveout velocity obtained from the $V_{mig}$ used in the migration process (in other words, $V_{nmo}$ is a root-mean-square running average of $V_{mig}$).

When the lateral velocity variations are significant and depth migration is required, the reverse moveout correction requires inversion of a ray-tracing. Ray-tracing produces a map between arrival time for every source-receiver pair and the reflection points (depths). Inversion of the ray-tracing mapping is the corresponding map between depths and arrival times.

The pre-stack time or depth migrated data with reverse moveout correction will contain the usual (at least approximately) hyperbolic moveout associated with normal primary reflection events. The migration process (reference numeral 122) will, in general, alter the reflection geometry if reflector dip is present and improve primary reflection continuity through contraction of diffraction noises. A post-migration $V_{nmo}$ analysis (reference numeral 126) will result in a new and better $V_{nmo}$ model which may be used to moveout correct the migrated pre-stack seismic data. The procedures used in performing these steps are identical to those used for the initial $V_{nmo}$ analysis (discussed above in connection with reference numerals 116 and 118).

As will be well known to persons skilled in the art, mute and stack procedures should be applied to the moveout corrected data (reference numeral 128). The results of the mute and stack operation are used in the normal incident pulse estimation (reference numeral 130). The quality of seismic images is often judged, at least in part, by comparisons between mathematical computations using corrected well measurements (known as "synthetic seismograms" or, more simply, "synthetics") and actual stacked seismic data. The procedure by which these synthetics are developed (reference numeral 132) is typically 1D normal incident modeling of primary P-wave to P-wave reflections. The synthetics are made using the corrected well measurements of P-wave velocity and density (reference numeral 106) and an estimated normal incident seismic pulse (also called a seismic wavelet). This and other wavelet estimation procedures will be well known to persons skilled in the art.

At reference numeral 134, the quality of the pre-stack migrated stacked section is judged on a number of issues which should include:
1. Comparison of the stack to the well synthetic at the well location.
2. Removal of diffraction events from the stack.
3. Vertical and lateral resolution improvements.

Successful application of the pre-processing phase of the invention is strongly data dependent and a matter of experience. If the final stack is judged to be good enough, the pre-processing phase of the invention (reference numeral 100) is complete. If the final stack is not good enough, then additional noise suppression (reference numeral 136) may be required (for example, multiples might be seen as a problem at this stage of the pre-processing), or adjustments might be made in the $V_{nmo}$ and $V_{mig}$ velocity models (reference numerals 138 and 140, respectively), as described below.

Updates to the initial or post-migration $V_{nmo}$ model might be used to deal with under- or over-migration of diffraction events. Velocity adjustments might also be used to deal with out-of-plane reflection events (in the 2D case only). Velocity updates are very data dependent. Velocity adjustments made to improve the quality of pre-stack time and depth migration procedures are, however, well known to persons skilled in the art of seismic data processing.

Adjustments made to the $V_{nmo}$ model will be used to update or correct the $V_{mig}$ model (reference numeral 140) prior to another pass at pre-stack time or depth migration (reference numeral 122). The migration process will be repeated with a new velocity model starting from the original (unmigrated) pre-stack seismic data (with, perhaps, additional noise suppression).

As noted above, there are three outputs from the pre-processing phase of the preferred embodiment: the pre-stack time or depth migrated seismic data (reference numeral 142); the moveout velocity model (reference numeral 144); and the edited and corrected wellbore measurements at the calibration well (reference numeral 146).

The p-τ Transformation

The preferred embodiment of the present invention is the low dip case where 1D modeling and inversion in the p-τ domain can be applied. Accordingly, for the preferred embodiment, the pre-processing phase is followed by a transformation of the pre-stack migrated, reverse moveout corrected seismic data from the time-offset (x-t) domain to the slowness-intercept time (p-τ) domain (reference numeral 150 in FIG. 1). In alternative embodiments of the invention, inversion may be applied in the x-t domain using ray tracing, as more fully described below.

Figure 3:
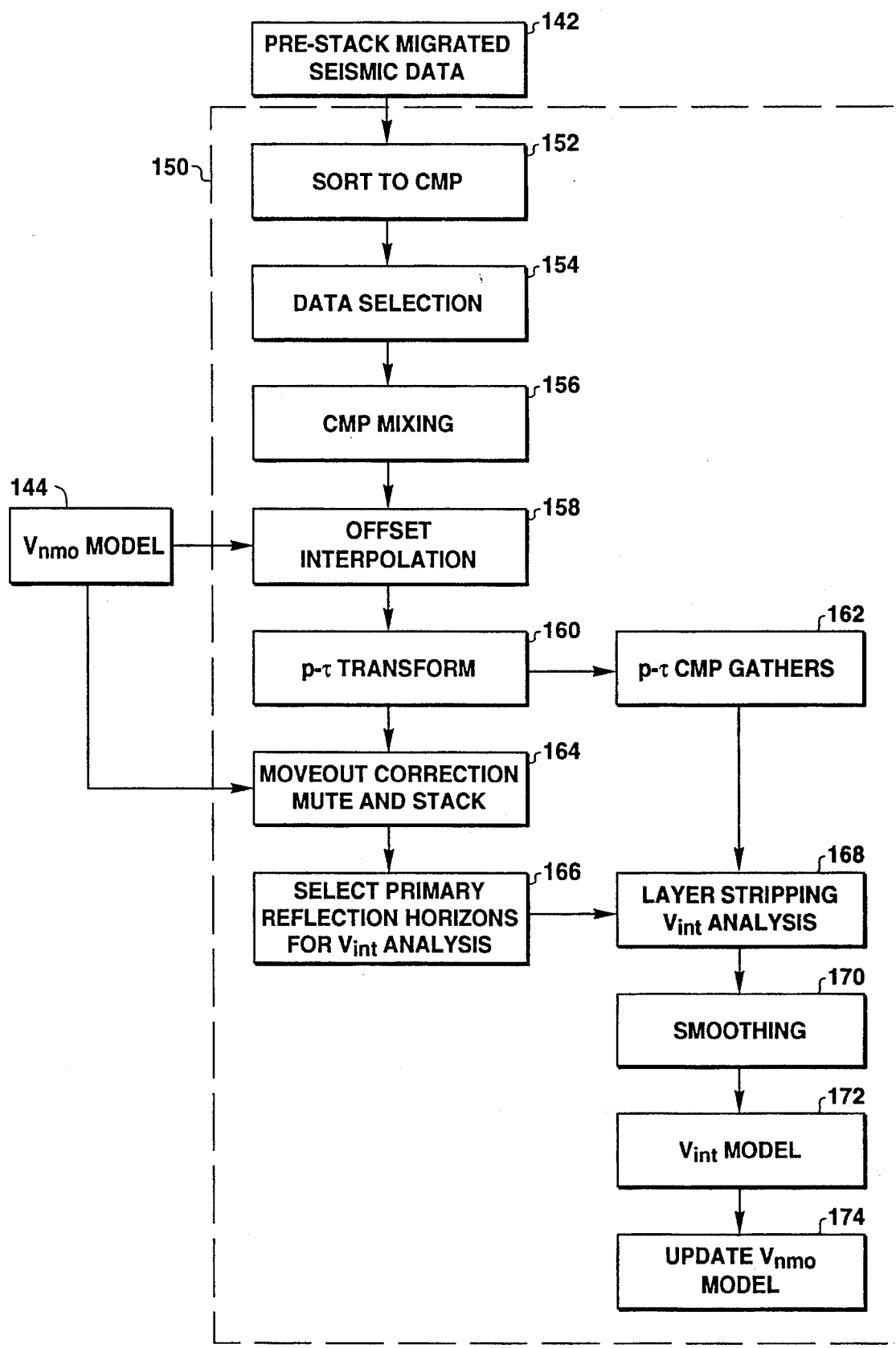
FIG. 3 is a flow chart showing the various steps of the p-τ transformation used in the preferred embodiment of the invention.

The p-τ transformation is carried out for each common depth point (CDP) gather. Thus, CDP gathers in x-t are transformed to CDP gathers in p-τ. FIG. 3 is a flow chart showing one embodiment of the data processing steps for the p-τ transformation and slant stack interval velocity analysis. Inputs to this process are:
1. Pre-stack seismic data in x-t after time or depth migration and reverse moveout correction (reference numeral 142).
2. A $V_{nmo}$ model (reference numeral 144).

The seismic data input to the transform process consists of "true amplitude" seismic reflection data (i.e., without corrections for geometric divergence) which resulted from the pre-processing steps described above. The inversion procedure will ultimately compare the reflection amplitudes of this data with predictions made by the 3D viscoelastic wave equation (specialized to plane parallel layers). Geometric divergence corrections applied to the input data would produce dramatically wrong results because the p-τ transform used in this invention automatically accomplishes the correction for geometric divergence.

Since the preferred embodiment is the low dip case, the data output from the time or depth migration procedure is sorted to common mid-surface point (CMP) bins (reference numeral 152). This step is not performed in the high-dip case. In the high-dip case, data is processed in shot order. The sort to common mid-surface bins places all data which has midpoint locations $Y=(Y_x,Y_y)$ which fall into the same rectangular area into a common data gather. Here $Y_x$ and $Y_y$ are defined by $$Y_x = \frac{S_x + P_x}{2} \qquad (10)$$

$$Y_y = \frac{S_y + P_y}{2} \qquad (11)$$

where $S=(S_x,S_y)$ is the horizontal location vector of the source, and $P=(P_x,P_y)$ is the horizontal location vector of the detector. This binning procedure involves defining bin dimensions. For example, a bin dimension of 20.5 feet has been used for a single 2D profile line. These procedures are well known to persons skilled in the art.

With 2D seismic data, $S_y$ and $P_y$ should be zero. However, as is well known in the art, there may be non-zero values of $S_y$ and $P_y$ if either the sources or the detectors are not located exactly along the profile line. For example, in marine seismic prospecting, the receiver cable may drift away from the profile line due to cross-currents (known as "cable feathering"). Corrections for cable feathering and other similar problems are well known.

At reference numeral 154, midpoint gathers whose reflection points cover the calibration and target locations of interest are selected from the midpoint sort. As discussed above, the selected data should extend beyond the regions of interest to minimize "edge" effects in interval velocity smoothing. Often, one hundred to one thousand gathers might be selected for each location of interest.

Rigorously speaking, the 1D model implies that all midpoint gathers should be completely identical. Those skilled in the art will understand that this assumption is violated to some extent by all actual data. In many cases of important practical interest, however, midpoint gathers can be usefully combined over distances of approximately one hundred feet. Advantages of appropriate mixing of midpoint gathers (reference numeral 156) are:
1. Mixing improves consistency with the 1D model.
2. For most data collection geometries, gather mixing improves the spatial sampling of offsets in the common midpoint gathers. The exact arrangement of offsets included in any given midpoint gather depends upon the shot point interval and upon the detector interval. Spatial sampling is an important issue for the p-τ transform.
3. Mixing can decrease random noises by increasing the number of traces used to analyze a given location in the subsurface.

The mixing process described here refers to a rolling mix. This implies that data from surrounding midpoint gathers is assigned to each input midpoint location. As will be well known to persons skilled in the art, no midpoint locations are eliminated by this procedure (as they would be if the data was binned at a large midpoint interval).

In many cases, even the mixed midpoint gathers will fail to fulfill the requirements on spatial sampling in the offset domain required by the p-τ transform. This difficulty is overcome by performing an interpolation (reference numeral 158) which makes use of the $V_{nmo}$ model (reference numeral 144) resulting from the pre-processing phase to place interpolated traces between the actual recorded offset traces. These procedures are well known to persons skilled in the art of seismic data processing.

The actual p-τ transformation (reference numeral 160) is applied to a tapered version of the midpoint gather data. The taper is necessary because the recorded amplitudes fall suddenly to zero after the maximum recorded offset location. The taper is applied to ensure that the input data smoothly falls to zero at the maximum offset. Without a taper, undesirable "abrupt edge" effects can appear in the transformed result. The taper is designed to roll the input data down to zero over the offsets which begin at a specified fraction of the maximum offset value (usually 80%) and reaching zero at the maximum offset. The effect of this tapering operation is incorporated into the inversion process so that only a very small portion of the initial offset range (less than about 5%) is actually lost.

The transformation applied in the preferred embodiment is known as a "radial, discrete, one-way wave, slant stack transform" implemented in the frequency domain. The theory behind such transforms is given in Beylkin, G., Discrete Radon Transform, *IEEE Transactions on Acoustics, Speech, and Signal Processing*, v. 35, pp. 162–172, 1987, and commercially-available computer software (e.g., Pro-Max marketed by Advance Geophysical Corp.) is capable of performing transforms of this type. The resulting transformed data obey the plane wave version of the viscoelastic wave equation. Modeling and inversion computations performed on the plane wave equation are simpler than in the corresponding offset domain equation. For example, the estimation of P-wave interval velocities for plane parallel layers can be accomplished by a layer stripping procedure which exploits special properties of this domain, as more fully described below. The common midpoint gathers output from the p-τ transformation (reference numeral 162) are used as inputs to the pre-stack inversion phase of the invention (discussed below) and to the interval velocity estimation process (reference numerals 164, 166, 168, 170, and 172).

The pre-stack inversion phase of the invention requires knowledge of the P-wave interval velocity model which "flattens" the primary reflections as well as possible. Up to this stage in the processing sequence, only a $V_{nmo}$ model and an approximate $V_{int}$ model (used for the pre-stack time or depth migrations) have been required. Successful viscoelastic inversions require $V_{int}$ models which are accurate (as measured by the degree to which they flatten the primaries), to better than 5%. Use of the maximum range of recorded offsets or reflection angles (up to about 50° in the most favorable cases) appears to require very accurate velocity estimations. Obtaining this degree of precision in velocity estimation usually requires additional efforts devoted to velocity estimation following the pre-processing steps (described above) and the p-τ transformation. The methods used in the present invention, horizon-based interval velocity estimation in the p-τ domain, while not new, have been refined to achieve the highest degree of precision possible, as more fully described below.

As will be well known to persons skilled in the art, a hyperbola on a CDP gather in the x-t domain maps onto an ellipse on the corresponding p-τ gather. See e.g., Yilmaz, O., *Seismic Data Processing,* Chapter 7, pp. 428–453, published by the Society of Exploration Geophysicists, Tulsa, Okla., 1987. Therefore, taking into account ray path bending for plane parallel reflectors (i.e., a 1D layered earth model), the primary reflections in a transformed midpoint gather will display "nested elliptic" moveout in the p-τ domain.

In the deep water marine situation, the water bottom will generally be the first visible primary reflector. For the first reflection event, the hyperbolic moveout of the x-t domain will be replaced by an elliptic moveout in the p-τ domain, as follows:

$$\tau_1(p) = \tau_1(0) \sqrt{1 - (pV_w)^2} \qquad (12)$$

where $\tau_1(p)$ is the primary reflection intercept time of the first (water bottom) reflector at slowness p, $\tau_1(0)$ is the primary reflection intercept time at zero slowness, and $V_w$ is the P-wave interval velocity of the water layer. The next reflection horizon will display an elliptic moveout time relative to $\tau_1(p)$, as follows:

$$\tau_2(p) = \tau_1(p) + (\tau_2(0) - \tau_1(0)) \sqrt{1 - (pV_2)^2} \qquad (13)$$

where $\tau_2(p)$ is the primary reflection intercept time of the second reflector at slowness p, $\tau_2(0)$ is the primary reflection intercept time of the second reflector at zero slowness, and $V_2$ is the P-wave interval velocity of the first layer beneath the water bottom. This model assumes constant P-wave velocity between the layers. If the velocity between the visible reflection interfaces is not in fact constant, then the interval velocity is replaced (approximately) by the root-mean-square average of the interval velocities within the layer. In general, the nth reflection horizon will display an elliptic moveout relative to the (n–1)th reflection horizon according to $$\tau_n(p) = \tau_{n-1}(p) + (\tau_n(0) - \tau_{n-1}(0)) \sqrt{1 - (pV_n)^2} \quad . \qquad (14)$$

Following the transform from the x-t domain to the p-τ domain (reference numeral 160), the transformed data is moveout corrected according to $$\tau(p) = t_0 \sqrt{1 - (pV_{nmo})^2} \quad , \qquad (15)$$

muted, and stacked (reference numeral 164). The p-τ stack is very similar to the x-t stack, although subtle differences may be seen due to the midpoint mixing and the frequency domain processing.

At reference numeral 166, a geologic interpretation is made using the p-τ stock (reference numeral 164) to identify the major primary reflection horizons. The interpretation process may use the normal incident synthetic (reference numeral 132) to verify the horizon identification. The identified major primary reflection horizons are used to estimate the P-wave interval velocities following a procedure described in Schultz, P. S., "A method for direct estimation of interval velocities," *Geophysics,* v. 47, pp. 1657–1671, 1982, which exploits the moveout properties of the data in the p-τ domain described above. The primary reflection horizons selected from the p-τ stack should conform to the major changes in the P-wave velocity structure in the subsurface region of interest. As noted above, the first reflection horizon for marine data is usually the water bottom reflection. The next horizon should usually be no closer (on average) than about 0.100 to 0.200 seconds and usually no farther than about 0.250 to 0.500 seconds. In the low reflector dip situation, the selected reflection horizons will be approximately parallel to each other (forming approximately a plane parallel layered model). Typically, five to seven layers are used in developing the P-wave interval velocity models. The selected reflection horizons should display abrupt breaks at fault boundaries. A selected horizon will display a shift (consistent with the actual rock structure) as it crosses a fault.

Once the primary reflection horizons are selected, a layer stripping procedure (reference numeral 168), as described by Schultz, supra, is used to determine the interval velocities. The layer stripping procedure proceeds from the shallowest reflector to the deepest. Ellipse fitting is used to estimate the interval velocity between the surface and the first reflection horizon. Once the first layer's interval velocity is found, the second layer's interval velocity is determined by applying ellipse fitting to the moveout time difference between the first horizon and the second horizon. The best-fit ellipse determines the interval velocity of the second layer. The process continues until the interval velocity is determined for all portions of the data above the deepest reflection horizon of interest. By convention, a single velocity (called the "basement" velocity) is assigned to the region beneath the deepest reflection horizon. Care must be used to avoid multiple reflections which will introduce errors into the estimated velocities. Scientific workstations are typically used to perform the ellipse fitting and to rapidly display the moveout corrected results.

Once a good initial estimate of the interval velocity structure is obtained, the layer stripping process can easily be repeated at each midpoint location in the transformed data. The resulting estimates of the layer interval velocities will naturally display variations between midpoint locations reflecting both geological variations in the actual rock velocities and noises in the seismic data. Lateral smoothing (reference numeral 170) of the estimated interval velocity within each layer suppresses the noise components. Smoothing is normally performed over lateral distances of a few hundred feet, but should not be performed across fault boundaries. Edge effects (in the final smoothed model) are suppressed by extending the velocity analysis beyond the region where inversion will eventually be applied. The final interval velocity model (reference numeral 172) should display only gradual lateral variation within each layer, should conform to the geologic interpretation, should agree closely with well measurements at well locations, and should generate flat moveout corrected gathers when the moveout correction is performed using the nested ellipse rule described above. Only primary reflections (consistent with a layered model) will be flattened by the correct interval velocity model. Multiple reflections and out-of-plane reflections (in 2D data) will display non-flat moveout. The final velocity model can be used to construct a new $V_{nmo}$ model (reference numeral 174), if desired.

Least-Squares Inversion

Before proceeding with the description of the pre-stack inversion phase of the invention (reference numeral 200 in FIG. 1 ), certain background information regarding the physical and mathematical details of the wave propagation model and the mathematical methods used in least-squares inversion will be provided. Additionally, certain refinements used in the present invention will be described.

The Convolutional Model

In physical terms, the preferred embodiment of the invention uses a wave propagation model of primary P-wave reflections which is valid for small contrasts in all elastic properties between the rock layers. The model is further specialized to be valid over only a restricted range of frequencies corresponding to the seismic passband (i.e., the range of frequencies which can be generated by seismic sources and then pass through the earth without significant attenuation). In practice, the model is approximately valid for frequencies above a certain lower value such as five Hertz. The upper limit is adjustable and is set by the fixed layer thickness using five to ten layers per minimum wavelength at the target zone. For example, assuming a seismic velocity of 8000 feet per second and a maximum frequency of 100 Hz., the minimum wavelength is 80 feet. Thus, the model typically would have a fixed layer thickness at the target zone of between 8 and 16 feet. Energy losses due to friction (attenuation) and interbed multiples are approximately accounted for by means of the P-wave quality factor. This wave propagation model is well known in the geophysical literature as the "convolutional model" and can be compactly expressed by a product of factors. In the marine situation, the pre-processed p-τ gathers will approximate the response of an array of hydrophones to the seismic energy generated by an array of marine air gun sources. The hydrophones and air guns are assumed to be located within an acoustic medium (the water layer) above a viscoelastic medium (the subsurface rock strata).

The Frequency Domain

Since attenuation is included, this model is most compactly expressed in the frequency domain which is obtained by means of the Fourier transform from the time domain. Suppose P(p, τ, Y) represents the p-τ amplitude of some transformed CMP gather at midpoint location Y at slowness p and intercept time τ. The complex quantity $\hat{P}$(p, ω, Y) is the discrete Fourier transform of P(p, τ, Y) with ω being the frequency (measured in radians per second). As is well known, the discrete Fourier transform of digital data collected over a specified time interval and at a specified time sampling rate is defined only for certain frequency values (which may be modified by zero padding and interpolation). Since these issues are well understood by persons skilled in the art, this discussion will ignore the differences between the discrete and continuous Fourier transforms. The frequency domain transformation (the "forward" transform) is $$\hat{P}(p,\omega_i,Y) = \sum_{j=1}^{Nt} \Delta\tau\, e^{+i\omega_i\tau_j} P(p,\tau_j,Y). \tag{16}$$

where the subscript i ranges over the Nf frequencies $\omega_i$ which represent the Nt uniformly spaced time sample values at points $\tau_j$. The time sample rate is $\Delta\tau$ usually 0.002 or 0.004 seconds). The inverse Fourier transform is then $$P(p,\tau_j,Y) = \sum_{i=1}^{Nf} \frac{\Delta\omega}{2\pi} e^{-i\omega_i\tau_j} \hat{P}(p,\omega_i,Y). \tag{17}$$

(Note that the symbol i is used herein as a layer index or counter when it is a subscript; otherwise, it is the complex imaginary ($i^2=-1$).)

Separation of the Model into Background and High Frequency Parts

The convolutional model used in the preferred embodiment of the invention is expressed mathematically by making a distinction between the low frequency or background changes in the subsurface parameters of density and velocities and the high frequency changes. It is assumed that this division occurs at approximately five Hertz, the low frequency end of the seismic frequency range. Thus, let $V_p(z)$ be the depth-dependent subsurface P-wave velocity. The depth beneath the ocean surface is z and we assume for the moment that we can ignore lateral changes. We can always separate $V_p(z)$ into two parts: $V_p^{background}(z)$ which contains changes below five Hertz and the rest which we will call $\Delta V_p(z)$. The part $\Delta V_p(z)$ contains the variations which are above five Hertz. The actual P-wave velocity is the sum of these two parts:

$$V_p(z) = V_p^{background}(z) + \Delta V_p(z). \tag{18}$$

The density and S-wave velocity can be decomposed in a similar manner.

Approximate Expression for the Reflection Coefficient

The reflection of compressional plane waves (P-waves) to compressional plane waves in a viscoelastic material is governed by a fairly complicated system of equations which give rise to somewhat complicated formulas for the predicted strength of the reflected wave. A well known approximation due to Bortfeld (see, Bortfeld, R., "Approximation to the reflection and transmission coefficients of plane longitudinal and transverse waves," *Geophysical Prospecting*, v. 9, pp. 485–502, 1961) retains only the most important parts. Bortfeld's equations, after some manipulation, give the P-wave reflection expressed as a function of depth, z, slowness, p, and midpoint location, Y:

$$y_{pp}(p,z,Y) = (1 - 4p^2 V_s^2(z,Y)) \frac{\Delta \rho(z,Y)}{2\rho(z,Y)} + \tag{19}$$

$$\frac{1}{1-p^2 V_p^2(z,Y)} \frac{\Delta V_p(z,Y)}{2 V_p(z,Y)} - 8p^2 V_s^2(z,Y) \frac{\Delta V_s(z,Y)}{2 V_s(z,Y)}.$$

$y_{pp}$ is a time integral of the usual reflection coefficient. $p(z,Y)$ are the background or long-period P-wave velocity, S-wave velocity, and density expressed as functions of depth and midpoint location. The functions $\Delta V_p(z,Y)$, $\Delta V_s(z,Y)$, and $\Delta \rho(z,Y)$ are the high frequency parts of the velocities and density.

Approximate Expression for the Recorded Marine Data

The convolutional model for marine recordings is expressed mathematically by a formula which involves the mid-point dependent P-wave and S-wave background velocities and the P-wave quality factor. The high frequency variations in velocities and density appear in the integrated reflection coefficient factor. The formula (valid for positive frequency $\omega$) is $$\hat{P}(p,\omega,Y) = \hat{S}(p,\omega,[\text{Source Array}],[\text{Detector Array}],Y) \times \tag{20}$$

$$\frac{2}{Z_w(p)} [r_{pp}(p,h_w,Y) \text{Taper}(x_{pp}(p,h_w,Y)) e^{2i\omega h_w l_w(p)} -$$

$$2i\omega T_{fs}^2(p,h_w,Y) \times \sum_{i=1}^{\text{Nlayer}} d_{layer} l_p(p,z_i,Y) e^{i\omega \tau_{pp}(p,z_i,Y)} \times$$

$$e^{-\omega a_{min}(\omega)/Q_{pp}(p,z_i,Y)} y_{pp}(p,z_i,Y) \text{Taper}(x_{pp}(p,z_i,Y))]$$

where the factor $\hat{S}(p, \omega,[\text{Source Array}],[\text{Detector Array}],Y)$ represents the effects of the air gun array, the source ghosts, the receiver array, and the receiver ghosts. (The ghosting effect at the source and receiver locations refers to the reflections of sound energy from the air-water interface.) Other implementations will be discussed as appropriate.

The P-wave arrival time at each layer is the quantity $\tau_{pp}(p,z_k,Y)$ defined by:

$$\tau_{pp}(p,z_k,Y) = 2h_w l_w(p) + 2 \sum_{i=1}^{k} d_{layer} l_p(p,z_i,Y). \tag{21}$$

where $h_w$ is the thickness of the water layer at surface location Y, and $d_{layer}$ is the uniform layer thickness of the thin layer model (eight to sixteen feet).

The non-negative function $\text{Taper}(x_{pp}(p,z_i,Y))$ is the offset tapering appropriate to the P-wave with slowness p reflecting from depth $z_i$ which arrives at offset $x_{pp}(p,z_i,Y)$:

$$x_{pp}(p,z_i,Y) = 2 h_w p V_w / l_w(p) + 2 \sum_{k=1}^{i} d_{layer} p V_p(z_k,Y)/l_p(p,z_k,Y). \tag{22}$$

The viscoelastic model implies a minimum-phase advance due to attenuation given by the complex term in the factor, $$a_{min}(\omega) = \left[ 1 + \frac{2i}{\pi} \ln\left(\frac{\omega}{\omega_0}\right) \right] \tag{23}$$

where $\omega_0$ is the normalization point for the background velocities, five Hertz, and $\ln(x)$ is the base-e logarithm. The factor $Q_{pp}(p,z_k,Y)$ is the angle dependent attenuation coefficient, $$\frac{1}{Q_{pp}(p,z_k,Y)} = \sum_{i=1}^{k} \frac{d_{layer}}{V_p(z_i,Y)} \frac{1}{\sqrt{1-p^2 V_p^2(z_i,Y)}} \frac{1}{Q_p(z_i,Y)}. \tag{24}$$

These formulas involve a number of angle-dependent objects which are defined by, $$l_w(p) = \frac{\sqrt{1-p^2 V_w^2}}{V_w}, \tag{25}$$

and, $$r_{pp}(p,h_w,Y) = \frac{Z_e(p,h_w,Y)E(p,h_w,Y) - Z_w(p)}{Z_e(p,h_w,Y)E(p,h_w,Y) + Z_w(p)}, \tag{26}$$

which is the water-bottom reflection arrival. The transmission factor for P-wave propagation through the water bottom into the elastic material below is, $$T_{fs}(p,h_w,Y) = \frac{\sqrt{Z_w(p)Z_e(p,h_w,Y)}^2 (1-2p^2 V_s^2(h_w))}{Z_e(p,h_w,Y)E(p,h_w,Y) + Z_w(p)}, \tag{27}$$

an identical factor $T_{sf} = T_{fs}$ appears for propagation of the reflected P-wave up through the water bottom from below which is why the formula for $\hat{P}$ (equation (20)) contains $T_{fs}^2$. The transmission factor contains more angle-dependent objects:

$$Z_w(p) = \frac{\rho_w V_w}{\sqrt{1-p^2 V_w^2}}, \tag{28}$$

$$Z_e(p,h_w,Y) = \frac{\rho(h_w,Y)V_p(h_w,Y)}{\sqrt{1-p^2 V_p(h_w,Y)^2}}, \tag{29}$$

$$E(p,h_w,Y) = (1 - 2p^2 V_s(h_w,Y)^2)^2 + 4p^2 V_s(h_w,Y)^4 l_p(p,h_w,Y)l_s(p,h_w,Y), \tag{30}$$

$$l_p(p,z,Y) = \frac{\sqrt{1-p^2 V_p(z,Y)^2}}{V_p(z,Y)}, \tag{31}$$

$$l_s(p,z,Y) = \frac{\sqrt{1-p^2 V_s(z,Y)^2}}{V_s(z,Y)}. \tag{32}$$

The convolutional model for negative frequencies is defined so that the Fourier transform $P(p,\tau_j,Y)$ is real.

The Source Representation

The source factor in the above model contains the directional effects created by the source and detector arrays as well as the directional effects of the surface ghosts and allows for the possibility of midpoint dependence. The source representation can be expressed as a series of terms using a double summation. The higher order terms in the inner summation (over l here) represent higher degrees of directional variation. The outer summation (over i here) represents a rolling smoother over midpoint locations:

$$\hat{S}(p,\omega,[S \ldots ],[R \ldots ],Y) = \tag{33}$$

-continued $$\sum_{i=1}^{NY} wt(Y-Y_i) \sum_{l=0}^{Nl} \frac{\hat{s}_l(\omega,[S\ldots],[R\ldots],Y_i)}{l^\epsilon} P_l(p/p_{max}).$$

The outer summation runs over midpoint locations which are summed with a weight function $wt(\ldots)$. A constant weight function implies a source model which is laterally uniform. A weight function which is zero when Y and $Y_i$ differ by more than the stacking bin increment is a completely local source model. (The source model can vary at each midpoint location.)

The complex coefficients $\hat{s}_l(\omega,[S\ldots],[R\ldots],Y_i)$ represent the source estimates at the grid locations $Y_1$, $Y_2$, .... The coefficient $1/l^\epsilon$ involves the integer l raised to the power $\epsilon$. This coefficient ensures that the higher terms in the inner summation only contribute to the source inversion when required by the data, as more fully described later. For example, using Nl=30 allows for a very general source model. The functions $P_l(p/p_{max})$ are the Legendre functions evaluated at ratio $p/p_{max}$. (Legendre functions are often used in expansions of directionally dependent functions. $P_0(x)=1$, $P_1(x)=x$, $P_2(x)=\frac{1}{2}(3x^2-1)$, ...) The denominator value $p_{max}$ is the maximum slowness value under consideration so that $p/p_{max}<1$. This formula can also be expressed in the time domain, $$S(p,\tau,[S\ldots],[R\ldots],Y) = \qquad (34)$$

$$\sum_{i=1}^{NY} wt(Y-Y_i) \sum_{l=0}^{Nl} \frac{s_l(\tau,[S\ldots],[R\ldots],Y_i)}{l^\epsilon} P_l(p/p_{max})$$

with real coefficients $s_l(\tau,[S\ldots],[R\ldots],Y_i)$ which have a short duration in the time domain. This means that the coefficients $s_l(\tau,[S\ldots],[R\ldots],Y_i)$ are zero for $\tau$ greater than about 0.200 seconds or less than about $-0.200$ seconds.

Formulation of the Linearized Inverse Problem

The above formulas define an approximation to measured seismic data, $D(p,\tau,Y)$, (after pre-processing and conversion to the p-$\tau$ domain) which are expected to be useful under the favorable conditions stipulated for the preferred embodiment. The mathematical approximation of the actual data is a model which depends upon the water velocity, the background P-wave velocity, the background S-wave velocity, the P-wave attenuation, the water bottom depth, the water bottom values of the velocities and density (which are called the "mud" values), the source coefficients $\hat{s}_l$, and the three ratios $l_{vp}=\Delta V_p/V_p$, $l_{vs}=\Delta V_s/V_s$, and $l_\rho=\Delta \rho/\rho$. These elastic ratios will be identified later as closely associated with the reflection coefficients of equations (1), (2), (3), (5), (7), and (8). All of these quantities depend upon midpoint location Y. The background parameters and $l_{vp}$, $l_{vs}$, and $l_\rho$ depend upon depth also. The water P-wave velocity is known. The background velocities are obtained by our layer stripping velocity analysis process (or other method) together with an assumed relation between $V_p$ and $V_s$. The mud values, $V_p(h_w,Y)$, $V_s(h_w,Y)$, and $\rho(h_w,Y)$ are usually assumed. The P-wave attenuation is found from VSP analysis or by a process of modeling and data comparison. This leaves the source coefficients $s_l$ and the three elastic ratios $l_{vp}$, $l_{vs}$, and $l_\rho$.

The process used to determine the model components which best match the data is called damped least-squares inversion. This means that the process seeks to reduce the squared difference between the actual data and the computed model to a minimum with penalty terms which force the updates in the model parameters to be as small as possible. The error measure and penalty terms together are called the "objective" function which is usually denoted by J:

$$J[s,l_{vp},l_{vs},l_\rho,\delta s,\delta l_{vp},\delta l_{vs},\delta l_\rho] = \qquad (35)$$

$$\frac{1}{2} \sum_{i=1}^{NY} \sum_{j=1}^{Np} \sum_{k=1}^{N\tau} W^2(p_j,\tau_k,Y_i) \, (D(p_j,\tau_k,Y_i) -$$

$$P(p_j,\tau_k,Y_i,s,l_{vp},l_{vs},l_\rho,\delta s,\delta l_{vp},\delta l_{vs},\delta l_\rho))^2 +$$

$$d^2 \sum_{i=1}^{NY} \sum_{l=1}^{Nl} \sum_{k=1}^{N\tau} (\delta s_l(\tau_k,[S\ldots],[R\ldots],Y_i))^2 +$$

$$d^2 \sum_{i=1}^{NY} \sum_{j=1}^{Nlayer} (\delta l_{vp}(z_j,Y_i))^2 + (\delta l_{vs}(z_j,Y_i))^2 + (\delta l_\rho(z_j,Y_i))^2.$$

The updates $\delta s$, $\delta l_{vp}$, $\delta l_{vs}$, $\delta l_\rho$ should reduce J to a minimum. The model updates, which are collected together in the vector $\delta X$, will be discussed below. The real positive numbers $W(p_j,\tau_k,Y_i)$ are weights, as more fully discussed below in connection with equation (59). The positive number d is the damping which places a penalty on non-zero updates to the model. In the damped inversion problem, these updates to the inverted model components will stay as close to zero as possible while still approximately fitting the data. This will be discussed in more detail below.

For a sufficiently small change in the model parameters, which are lumped together as $\delta X_k$ so that the vector $\delta X_k$ contains all of the corrections to the source coefficients and all of the corrections to the ratios $l_{vp}$, $l_{vs}$, and $l_\rho$ at all midpoints and depth points, $$P(p,\tau,X) = P(p,\tau,X_0) + \sum_{j=1}^{NX} \frac{\delta P(p,\tau,X_0)}{\delta X_j} \delta X_j + \ldots \qquad (36)$$

The coefficients of $\delta X_j$ in the summation are the Fréchet derivatives of the modeling formula with respect to the model parameters at the location of the initial solution. The Fréchet derivatives are computed by symbolically inserting perturbed values of the source coefficients and the elastic ratios into the expression for $P(p,\tau,X)$:

$$s_l(\tau,[S\ldots],[R\ldots],Y_i) \to s_l(\tau,[S\ldots],[R\ldots],Y_i) + \delta s_l(\tau,[S\ldots],[R\ldots],Y_i) \qquad (37)$$

$$l_{vp}(z,Y) \to l_{vp}(z,Y) + \delta l_{vp}(z,Y) \qquad (38)$$

$$l_{vs}(z,Y) \to l_{vs}(z,Y) + \delta l_{vs}(z,Y) \qquad (39)$$

$$l_\rho(z,Y) \to l_\rho(z,Y) + \delta l_\rho(z,Y) \qquad (40)$$

and mathematically retaining only the coefficients of the first powers of $\delta s_l$, $\delta l_{vp}$, $\delta l_{vs}$, and $\delta l_\rho$.

The linearized formula is usually written as a matrix equation. Let's begin with the one midpoint case:

$$P(p,\tau_i,Y,X) = P(p,\tau_i,Y,X_0) + \sum_{j=1}^{NX} A_{ij}(p,Y,X_0)\delta X_j \qquad (41)$$

where $$A_{ij}(p,Y,X_0) = \frac{\delta P(p,\tau_i,Y,X_0)}{\delta X_j} \qquad (42)$$

Suppressing the indices, this is written as $$P(p,X) = P(p,X_0) + A(p,X_0)\delta X \qquad (43)$$

where $P(p,X)$ is a vector of $N\tau \times NY$ components ($NY=1$ since we are using the one midpoint case as an illustration at this point) with values $$P(p,\tau_i,Y,X) \text{ for } i=1,\ldots,N\tau. \qquad (44)$$

The symbol $\delta X$ is a vector of NX components $$\delta X_j \text{ for } j=1,\ldots, NX. \qquad (45)$$

Finally, $A(p,X_0)$ is a matrix of $(N\tau \times NY) \times NX$ components $A_{ij}(p,Y,X_0)$. The data is a vector $D(p)$ of $N\tau \times NY = 1$ components with values $$D(p,\tau_i,Y) \text{ for } i=1, \ldots, N\tau. \quad (46)$$

The multiple midpoint case just means that there are multiple $\tau$ vectors for each fixed slowness. The product of the number of time points times the number of midpoint locations is $$N\tau Y = N\tau \times NY. \quad (47)$$

The least-squares solution to finding an improved solution, $X_0 + \delta X$ starting from the known solution $X_0$ is obtained by solution of the normal equations for the updates $\delta X$ $$\sum_{j=1}^{Np} \Delta p [A^T(p_j,X_0) W^T(p_j) W(p_j) A(p_j,X_0) + d^2 I] \delta X = \quad (48)$$

$$\sum_{j=1}^{Np} \Delta p A^T(p_j,X_0) W^T(p_j) W(p_j) [D(p_j) - P(p_j,X_0)]$$

where the superscript T denotes the matrix transpose, $A_{ij}^T = A_{ji}$, W is an $N\tau Y \times N\tau Y$ diagonal matrix of weights (discussed below in connection with equation (59)), d is the damping factor, and I is the $NX \times NX$ unit matrix (one on the major diagonal and zero elsewhere). The normal equation has been expressed for the situation of Np discrete slowness values with uniform spacing $\Delta p$. The damping factor, d, is proportional to the magnitude of the re-weighted seismic data.

Discussion of the Linearized Inverse Problem

The process of computing a model seismogram from model components (source coefficients, elastic ratios, background velocities, etc.) is called the "forward map." The forward map process maps from model space into data space. The matrix $A(p,X_0)$ is the "linearized forward map." It goes from model space into data space also. The transpose matrix $A^T(p,X_0)$ is the "adjoint map," which is well known in seismic processing as "pre-stack migration." The adjoint map goes from data space into model space (i.e., a depth migration). Solution of the linearized inverse problem calls for solution of a set of NX linear equations constructed from the linearized map and the associated adjoint map or pre-stack depth migration process for the NX unknown model updates. The right-hand side of the normal equations contains the adjoint map applied to the data residual, the difference between the initial model and the actual data. If the residuals are zero, the computed updates will be zero. The damping term, $d^2 I$ is included as an adjustable control which forces the solution to be as small as possible and still approximately fit the data. The $NX \times NX$ matrix, $$N = \sum_{j=1}^{Np} \Delta p [A^T(p_j,X_0) W^T(p_j) W(p_j) A(p_j,X_0) + d^2 I] \quad (49)$$

is called the "normal map." The normal map procedure maps model space into model space. The least-squares normal equations involve a summation or stack of the slowness values following the pre-stack depth migration step. This summation will destroy the ability of the normal equations to converge to the correct solution unless the correct background velocity is used in the modeling and adjoint processes because the contributions at the different slownesses will tend to average out. The normal equations tell us that if we apply modeling, then pre-stack depth migration, and then stacking to the least squares solution, the result will equal the stacked, pre-stack depth migrated data residual (i.e., the difference between the data and the current model).

Solution of the Linearized Inverse Problem

The desired solution obeys a system of linear equations of the form $Nx=b$, so a good method for solving large linear systems is required. Typical models often have one thousand layers for each midpoint location plus about thirty source coefficients (each composed of 100 or 200 $\tau$points) for each midpoint. Since there are three elastic parameters to estimate, there are up to six thousand unknowns associated with each midpoint location. The examples discussed below treated about one hundred midpoints each so there are about 600,000 unknowns extracted from about ten million data points (100 midpoints, 50 slowness values each, 2000 points per trace). Each midpoint inversion is independent of others except for the coupling implied by the source model. Iterative solutions are used to solve the linear system $Nx=b$. These solutions construct the desired solution x from the vectors b, Nb, $N^2b$, . . . . This means it is never necessary to create the matrix N but only the action of N on an arbitrary vector: $y=Nz$. Iterative solutions have another very attractive feature, the first iteration recovers the largest eigenvalue (the most important contribution to the solution), the next iteration recovers the next largest eigenvalue (the next most important contribution to the solution), and so on.

In general, an exact solution to $Nx=b$ is not needed since this would uselessly magnify noises in the data. This problem arises because some parts of the model influence the simulated data much more than other parts of the model. An example is provided by model components associated with frequencies near the endpoints of the source spectrum. After NX iterations, the complete solution to $Nx=b$ would be constructed, but for large linear systems such as this, experience shows that only ten to one hundred iterations generate all useful contributions to the solution. This fact reduces the number of computations needed and provides the best solution. Best results are in fact obtained when the damping is reduced during the iteration process.

Damping Procedures, Choice of Inversion Variables, and Elastic Resets

Solution of the linear system by iterative methods, which will be referred to as the "inner loop," is the core procedure of the inversion process. A large number of tests with real and synthetic data have resulted in a procedure which appears to generate the best results for the inverted parameters. The recommended procedure involves reduction of the damping weight d in multiple inversion stages. Each inversion stage consists of a number of inner loop iterations at fixed damping weight. Each stage represents a search for updates in the model parameters which reduce the object J starting from the input model for that stage. Typically, the number of stages (e.g., five to eight) and the damping program are selected based on a study of the calibration well. Reflectivity inversions typically begin with a damping of five to ten percent at the first stage and reduce it to zero at the last stage; wavelet inversions often begin with a damping of one-half to one percent and reduce it to zero at the last stage. Each stage involves ten to twenty inner loop iterations. Reduction of the degree of damping as iterations proceed is a well known method in numerical optimization.

Closely associated with the choice of the damping program is the choice of inversion variables. Variable choice and damping are related because they appear together in the objective J. The appropriate variable choice, ultimately, is determined by experience at the calibration well. A number of choices were investigated:

$$l_{p1} = \frac{\Delta V_p}{V_p} \; ; \; l_{p2} = \frac{\Delta V_s}{V_s} \; ; \; l_{p3} = \frac{\Delta \rho}{\rho} \tag{50}$$

$$l_{p1} = \frac{\Delta V_p}{V_p} + \frac{\Delta \rho}{\rho} \; ; \; l_{p2} = \frac{\Delta V_s}{V_s} + \frac{\Delta \rho}{\rho} \; ; \; l_{p3} = \frac{\Delta V_s}{V_s} \tag{51}$$

$$l_{p1} = \frac{\Delta V_p}{V_p} + \frac{\Delta \rho}{\rho} \; ; \; l_{p2} = \frac{\Delta V_s}{V_s} + \frac{\Delta \rho}{\rho} \; ; \; l_{p3} = \frac{\Delta \rho}{\rho} \tag{52}$$

$$l_{p1} = \frac{1}{2}\left[\frac{\Delta V_p}{V_p} + \frac{\Delta \rho}{\rho}\right] ; l_{p2} = \frac{\Delta \rho}{\rho} \; ; \; l_{p3} = \frac{\Delta V_s}{V_s} \tag{53}$$

$$l_{p1} = \frac{1}{2}\left[\frac{\Delta V_p}{V_p} + \frac{\Delta \rho}{\rho}\right] ; l_{p2} = \frac{\Delta V_s}{V_s} \; ; \tag{54}$$

$$l_{p3} = \frac{1}{2}\left[\frac{\Delta V_p}{V_p} - \frac{\Delta \rho}{\rho}\right]$$

$$l_{p1} = \frac{1}{2}\left[\frac{\Delta V_p}{V_p} + \frac{\Delta \rho}{\rho}\right] ; \tag{55}$$

$$l_{p2} = \frac{1}{2}\left[\frac{\Delta V_s}{V_s} + \frac{\Delta \rho}{\rho}\right] ; l_{p3} = \frac{\Delta V_p}{V_p} + \frac{\Delta V_s}{V_s} - 2\frac{\Delta \rho}{\rho}$$

$$l_{p1} = \frac{1}{2}\left[\frac{\Delta V_p}{V_p} + \frac{\Delta \rho}{\rho}\right] ; \tag{56}$$

$$l_{p2} = \frac{\Delta V_s}{V_s} \; ; \; l_{p3} = \frac{\Delta V_p}{V_p} - \frac{\Delta \rho}{\rho} \; .$$

Persons skilled in the art could easily develop other choices. An identical set of definitions govern the updates, $\delta l_{p1}$, $\delta l_{p2}$, and $\delta l_{p3}$. For example, the updates corresponding to equation (51) would be $$\delta l_{p1} = \delta l_{vp} + \delta l_\rho; \; \delta l_{p2} = \delta l_{vs} + \delta l_\rho; \; \delta l_{p3} = \delta l_{vs} \tag{51a}$$

Similar equations for updates corresponding to equations (50) and (52)–(56) could be easily developed. These choices are motivated by an analysis which indicates that (in the single reflector case) the best determined elastic parameter should be the P-wave impedance $Z_p = \rho V_p$; the next best parameter should be the S-wave impedance $Z_s = \rho V_s$; and the third best determined parameter should be what's left. The last option (equation (56)) appears to perform best. This option uses the linearized version of $Z_p$ (i.e., the high frequency part of P-wave impedance divided by the background value of P-wave impedance) as one of the inversion parameters, $$l_{p1} = \frac{1}{2} \frac{\Delta Z_p}{Z_p} \approx \frac{1}{2}\left(\frac{\Delta V_p}{V_p} + \frac{\Delta \rho}{\rho}\right) \tag{57}$$

with the approximately orthogonal parameter, $$l_{p3} = \frac{\Delta V_p}{V_p} - \frac{\Delta \rho}{\rho} \tag{58}$$

as another parameter. The remaining parameter is just the S-wave velocity contribution. This choice has computational advantages. During early stages of the inner loop iterations the updates to P-wave velocity and density remain almost equal and updates to the S-wave velocity component remain small also. Thus, only $\delta l_{p1}$ changes from zero. (In the stage 1 step all reflectivity variables are started at zero.) The factor of ½ in the definition of $l_{p1}$ (but not in $l_{p3}$) leads to a damping process which favors correlated density and P-wave velocity updates.

The multi-stage approach lends itself to schemes which attempt to accelerate convergence of the reflectivity inversions. The P-wave impedance variations alone account for the major part of the reflected seismic energy. (In synthetic seismograms computed from Gulf of Mexico wells, for example, the P-wave impedance variations contribute up to about 90% of the reflected energy, the density and S-wave velocity variations together contribute the remainder.) The P-wave impedance variations will, therefore, converge more rapidly than do the density variations or the S-wave velocity variations alone. The inverted P-wave impedance variations obtained at the end of an inversion stage can be used to initialize new guesses for the density and S-wave velocity variations used to begin the next inversion stage. The other option, of course, is to begin the next stage of inner loop iterations with the result of the previous stage for all three elastic parameters. The process of using Gardner's relation (Gardner's relation, which predicts density from P-wave velocity, will be presented below) and the mudrock relation, supra, to produce initial estimates of density and S-wave velocity variations is referred to as "elastic parameter resets." Resets between the inversion stages are useful in actual data inversions because, during the accumulation of large numbers of inner loop iterations there is a tendency for noises to gradually appear in the more noise-sensitive density and S-wave components. The resets help eliminate these noises by forcing the density and S-wave components to be fit only during the last one or two inversion stages. As with the damping and the choice of inversion variables, the choice of resets between the inversion stages is a data dependent issue usually resolved by study of inversion results at the calibration well.

Computer Implementation

The use of iterative solution methods means that a computer solution of the linearized inverse problem may be constructed by providing sub-programs which produce the action of the forward map, the linearized forward map, the adjoint map, and the normal map on general vectors of the appropriate model or data space. A software package developed and provided by the Rice University Inversion Project (TRIP) is available which implements the requested mapping process and/or iterative solution process by calling model specific sub-programs written (by the user) to implement the modeling equations displayed above. This package also implements the differential semblance inversion concept mentioned above which can be applied to invert for the background P-wave velocity.

The TRIP inversion software provides for the use of three different inner loop iteration methods: conjugate residuals, conjugate gradients, and back projection with Chebyshev acceleration. (See, Symes, W. W., *DSO User Manual and Reference Guide,* Version 1.1, June 1993, The Rice Inversion Project, Department of Computational and Applied Mathematics, Rice University, Houston, Tex.) Conjugate residuals appear to be the most efficient method for use in the present invention.

More General Embodiments

The formulation given here is more general than the preferred embodiment (inversion using 1D models with input seismic data in the p-τ domain). In the more general case, the p-τ domain is not used. The data is processed directly in the offset domain using shot order instead of common slowness gathers. Thus, the slowness index p is replaced by a shot index. The midpoint index within each common slowness gather is replaced by the detector index within the shot gather. In the general case, the forward map is no longer represented by a specific formula. The forward map is obtained either by a finite difference solution of the wave equation using memory variables to model attenuation, or by a Kirchoff integral representation (an asymptotic primaries-only approximate solution to the complete wave equation) using a ray tracing procedure to compute the arrival times. The Kirchoff approach is the general method (because it can be applied to dips higher than 10°) which comes closest to the p-τ convolutional model discussed above. The same concepts and the same language apply to even the most general situation.

Another generalization not discussed above is the inclusion of other model parameters in the inversion process. Other parameters which might reasonably be updated by an inversion procedure are the water-bottom velocities and density ($V_p(h_w,Y)$, $V_s(h_w,Y)$, and $\rho(h_w,Y)$) and the P-wave attenuation quality factor $Q_p(z,Y)$. Inclusion of these parameters into an inversion process requires computation of the appropriate Fréchet derivatives. Treatment of the background parameters by a least-squares inversion process is not a good idea because the stacking process implied by the normal equations destroys the information needed to make a useful update unless the background velocity is almost perfectly correct. A solution to this difficulty is to alter least-squares inversion to differential semblance optimization. This idea is presented in Symes, W. W. and Carazzone, J. J., "Velocity Inversion by Coherency Optimization," (proceedings of the Geophysical Inversion Workshop, Sep. 27–29, 1989, Houston, Tex.) published in *Geophysical Inversion*, edited by J. Bee Bednar, Society for Industrial and Applied Mathematics, Philadelphia, Pa., 1992. Extension of least-squares inversion to include differential semblance inversion has been incorporated into the TRIP software by inclusion of computations of Fréchet derivatives with respect to the background P-wave velocity and their adjoints. This feature provides a mechanism for updates to the background velocity.

Yet another generalization of the model not discussed above is the inclusion of elastic mode conversions (P-waves converting to S-waves and vice versa). This situation calls for an S-wave quality factor and a highly accurate S-wave background velocity to account for the S-wave arrival moveouts. In marine data from many places in the Gulf of Mexico, the soft water bottom materials appear to render such mode converted arrivals almost very difficult to detect. (The strength of the mode conversions at the water bottom are proportional to the S-wave velocity at the water bottom raised to the 1.5 power. It is usually assumed that the S-wave velocity at the water bottom is only a few percent of the P-wave velocity.) Since on-land seismic measurements can include recordings of both vertical and horizontal motion, another generalization of the invention is inclusion of recorded S-waves.

The Weight Function

This formulation has included a weight function $W(p,\tau,Y)$ which can be defined to accelerate convergence of the iterative solution of the system $Nx=b$. By far the most important cause of slow convergence is the mis-scaling caused by the attenuation of the propagating P-waves due to friction. Selection of an appropriate weight function significantly improves this situation. The weight function used in the preferred embodiment is derived by computing the exponential decay ratio applied to the seismic wavelet at each depth location for each slowness and each midpoint:

$$w(p,z,Y) = \frac{\sum_{i=1}^{Nf} |e^{-\omega_i/Q_{pp}(p,z,Y)} \hat{S}(p,\omega_i,[S\ldots],[R\ldots],Y)|}{\sum_{i=1}^{Nf} |\hat{S}(p,\omega_i,[S\ldots],[R\ldots],Y)|} \quad (59)$$

and applying a compensating factor of $$W(p,\tau_{pp}(p,z,Y),Y) = p^\alpha/w(p,z,Y) \quad (60)$$

where $\alpha$ is a user-adjustable option for altering the weight given to the larger slowness values ($\alpha$ is greater than or equal to 0) at the corresponding arrival time $\tau_{pp}(p,z,Y)$. In equation (59), the vertical bars denote the complex absolute value, $$|z| = \sqrt{z_r^2 + z_i^2} \quad \text{with } z = z_r + iz_i. \quad (61)$$

This weight factor is automatically smooth and ranges from one at the water bottom to about ten or twenty at the basement.

The Pre-Stack Inversion Phase

Figure 4:
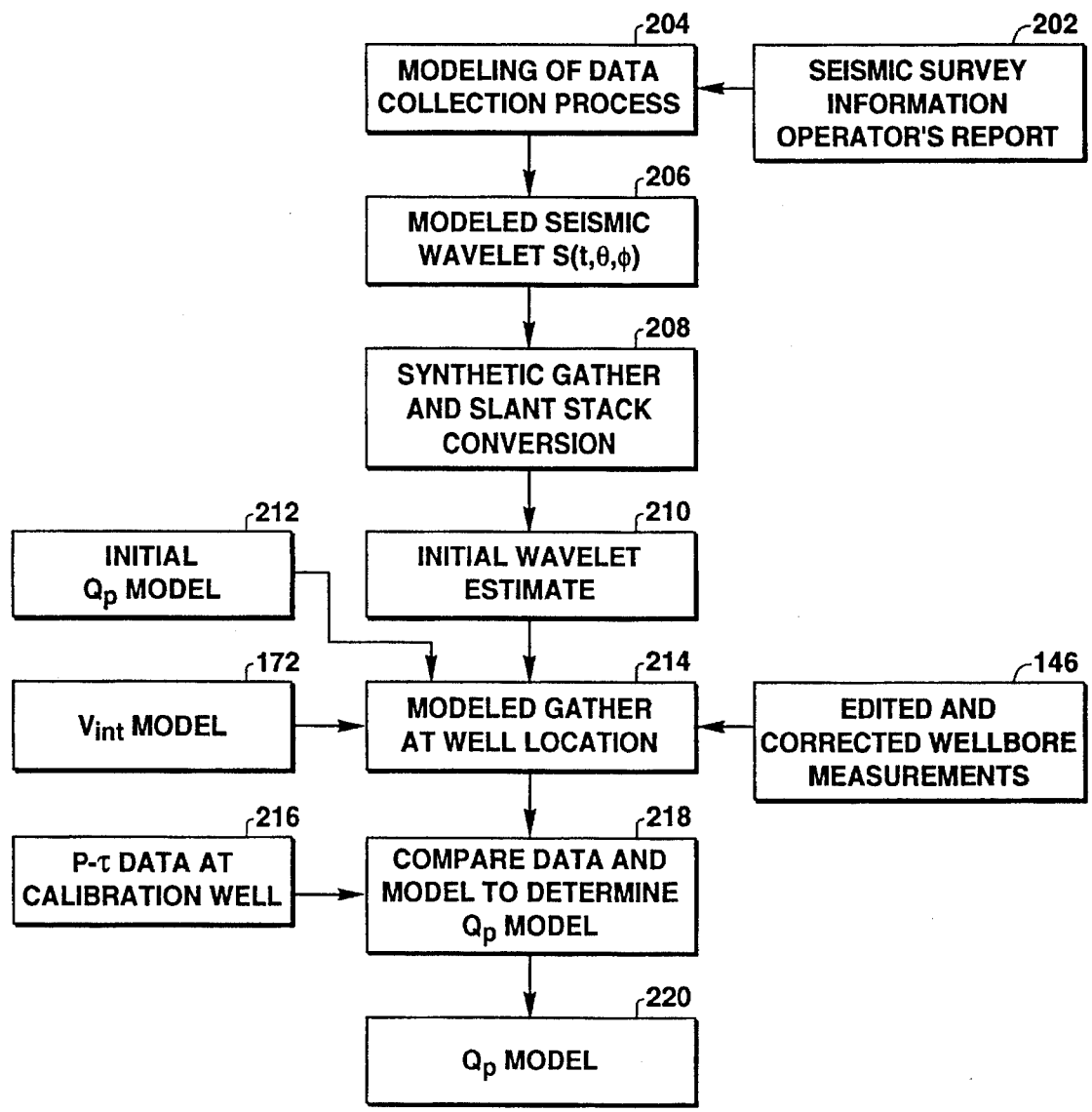
FIGS. 4, 5, and 6 are flow charts showing the various steps used in the preferred embodiment of the pre-stack inversion phase of the invention.
Figure 5:
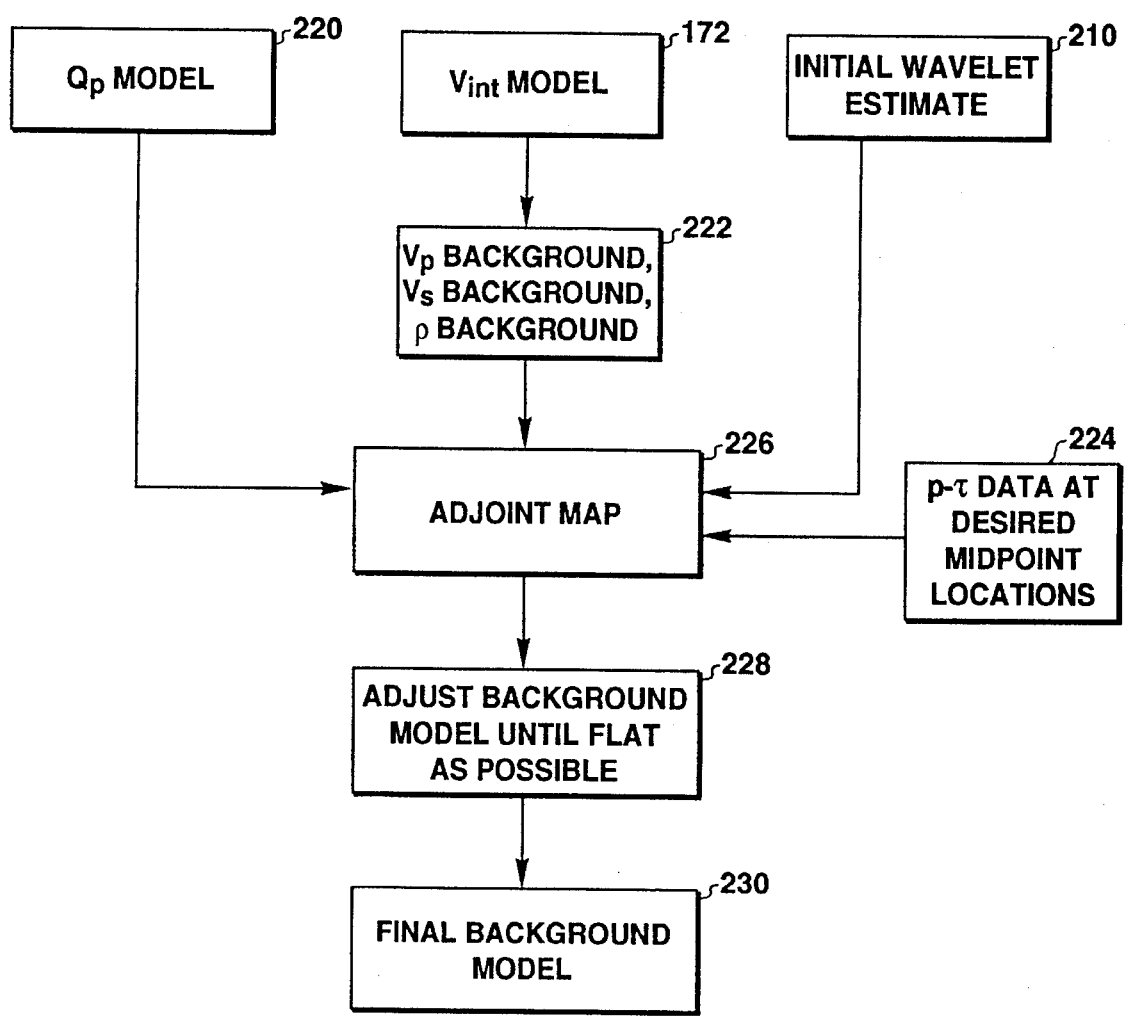
Figure 6:
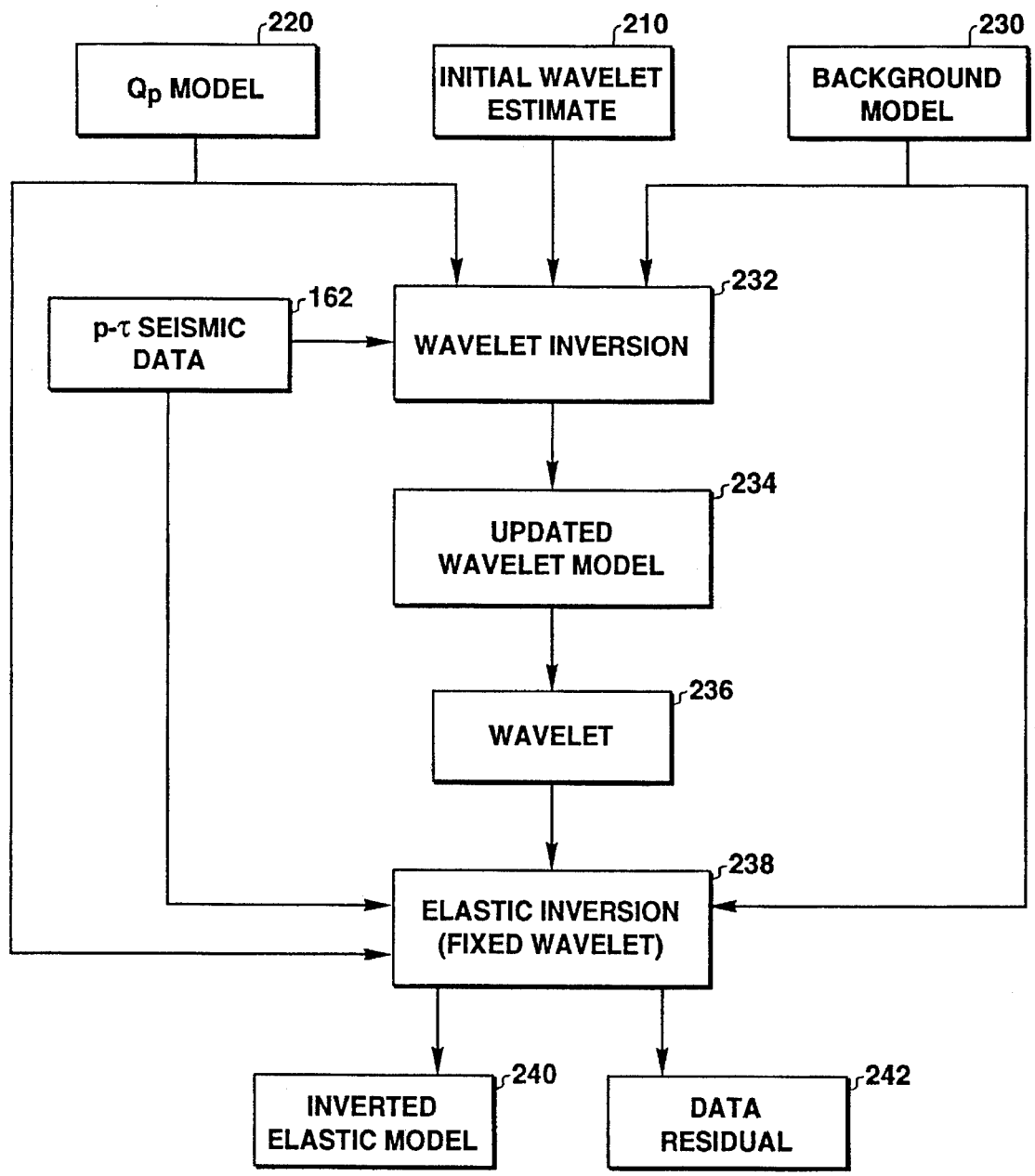

The next phase of the invention is the pre-stack inversion phase (reference numeral 200 in FIG. 1). The actual inversion process used in the preferred embodiment will be described in terms of the least-squares inversion tools (forward map, adjoint map, linearized forward map, and normal map, plus the concept of iterative solution of the least-squares normal equations) explained above. FIGS. 4, 5, and 6 are flow charts which illustrate the inversion process. In the preferred embodiment, the TRIP inversion software referred to above is used to implement the inversion process. However, persons skilled in the art could readily develop other computer programs for implementing the least-squares inversion based on the teachings set forth herein. The basic steps of the inversion process are:
1. Obtain an initial wavelet estimate,
2. Obtain an initial estimate of the P-wave quality factor,
3. Use inversion to refine the initial wavelet estimate, and
4. Using the updated wavelet estimate, use inversion to estimate the elastic reflection coefficients (reflectivities) at midpoint locations of interest over calibration and target locations.

The initial wavelet estimate can be obtained either from computation using the known parameters of the data collection process, as more fully described below, or by actual physical recording of the output source signature.

Initial Wavelet Estimation and Determination of P-wave Quality Factor

FIG. 4 shows the data flow for the creation of the initial wavelet model and for determination of the attenuation model in the preferred embodiment.

Technical details associated with how the seismic survey was conducted are an important input to this process (reference numeral 202). These details are obtained from the survey operator's report. Details of importance for modeling the effective seismic wavelet in the marine case include:
1. Configuration of the source array,
2. Air-gun design, volumes, and far-field signatures,
3. Source detonation interval,
4. Configuration of streamer cables,
5. Configuration of the hydrophone array,
6. Applied digital and analogue filters, and
7. Tow depths of sources and recording cables.

In the land recording situation, additional details are needed:
1. Configuration of the vibrator or other source arrays,
2. Vibrator sweeps or weights of explosives,
3. Source interval,
4. Configuration of geophone or hydrophone recording cables,
5. Configuration of geophone or hydrophone arrays,
6. Applied digital and analogue filters,
7. Surface soil conditions,
8. Weathered layer thickness and seismic velocity, and
9. Detonation depths of downhole sources.

The survey information is used to model the effective wavelet produced and recorded by the data collection system (reference numeral 204). This effective wavelet is the directionally dependent wavelet which would be observed far (at 10,000 feet, for example) from the source in a uniform material (sea water for example). This is called the "far-field wavelet." In the general 3D case, the far-field wavelet, $S(\phi,\theta,t)$, is a function of two angles:
1. Angle in the horizontal plane, $\phi(0°$ to $360°)$, and
2. Angle in the vertical plane, $\theta(-90°$ to $+90°)$.

In the 2D case, only the wavelet within the seismic profile plane $S(\theta,t)$ is required since out-of-plane reflections are ignored. In the marine case, wavelet modeling requires the far-field signatures of the air guns used in the actual data collection. Computer programs running on scientific workstations which produce the required far-field signatures are used to design marine seismic surveys. For example, the MODGUN simulation software marketed by Seismic Research and Development A/S may be used to produce an estimate of the outgoing (source and detector ghosted) far-field wavelet as a function of angle. In the land case, the attenuating and non-linear properties of the near-surface material must be taken into account and wavelet modeling is correspondingly a more difficult procedure.

In the low reflector dip case, only energy propagating away from the source toward the detectors will be reflected at the detectors. Since the modeled seismic wavelet, $S(\phi,\theta,t)$, changes smoothly with respect to angle, the preferred embodiment uses MODGUN estimates at five degree intervals ranging from zero degrees to eighty degrees as inputs. An angle of zero degrees corresponds to vertically downward-going energy. An angle of ninety degrees corresponds to horizontal propagation. Interpolation is used to produce the modeled wavelet at arbitrary angles (reference numeral 206).

The modeled seismic wavelet (ideally) accounts for the effects of the source and detector arrays and for the source and receiver ghosts. (A source ghost is created by the reflection of the source energy at the air-water interface; a detector ghost is created by the reflection of the up-going energy at the air-water interface back down to the detector. Ghosts also appear in on-land seismic data when sources or detectors are not located at the air-land interface. Ghost modeling in on-land data is more difficult than in the marine case and requires information about the surface and near-surface conditions.) The modeled seismic wavelet is converted to the p-τ domain by applying the slant stack transform to a synthetic gather made from the modeled seismic wavelet (reference numeral 208). This synthetic is made by shifting the wavelet, at the appropriate reflection angle, to the predicted hyperbolic arrival time corresponding to a reflection event with normal incident two-way arrival time of one second and applying the geometric divergence factor. This corresponds to a physical reflection process in a uniform velocity material, such as sea water, in which the reflection coefficient does not vary with angle. The same p-τ transform used for the actual seismic data is applied to the synthetic source gather except that the maximum offset is doubled so that no tapering effects enter the estimated source coefficients. (The tapering used to prevent edge effects in the p-τ transform is accounted for in the actual modeling so it shouldn't be built into the initial source estimate.) The resulting p-τ seismogram is then fit to the source model for the single midpoint case:

$$S(p,\tau,[S\ldots],[R\ldots]) = \sum_{l=0}^{Nl} \frac{s_l(\tau,[S\ldots],[R\ldots])}{l^{\epsilon}} P_{(p/p_{max})} \quad (62)$$

to yield an initial estimate for the coefficients $s_l(\tau,[S\ldots],[R\ldots])$. The fitting process involves a least-squares fit between the source model and the p-τ seismogram. Preferably, $\epsilon$ is set to approximately 0.5 in order to allow for some changes in source directivity during the source inversion step (reference numeral 232 on FIG. 6).

The initial wavelet estimate (reference numeral 210) takes the form of the Nl coefficients, $s_l(\tau,[S\ldots],[R\ldots])$ assigned to each midpoint location $Y_i$ within the data. The initial wavelet estimate therefore comprises a total of $N\tau_{source} \times Nl \times NY$ points. The coefficients $s_l$ are represented as uniformly sampled time vectors symmetric about zero time. The usual source model runs from $-0.200$ to $+0.200$ seconds. (This allows for both zero-phase source models in which the major source energy arrives at zero time and for minimum phase source models in which the major source energy arrives well after zero time. Mixed-phase source models are also included.)

Specification of the source model is completed by giving the weight function $wt(Y-Y_i)$ which controls the degree of midpoint smoothing which will occur when the source models at different midpoints are no longer identical. The appropriate degree of midpoint smoothing is a data-dependent issue. Both constant weights (no midpoint variation in source models allowed) and weights which mix midpoints over ten to fifty stacking bins have been used. Greater degrees of noise in the data could dictate more mixing. High data quality and the desire for detailed subsurface parameter mapping could dictate less (or even no) mixing. Controlling factors include the extent of variation potentially present in the subsurface material near the water bottom (low or high velocity zones near the water bottom can produce alternating patterns of greater or lesser seismic illumination at the target zone. Under some circumstances, use of appropriately chosen source models can mitigate the effect of varying illumination strength from the final inverted models.)

Other variations of the method used to obtain an initial wavelet estimate include the use of MODGUN simulations without the effects of the detector ghosts or detector arrays. In this situation, the effects of detector ghosts and arrays are inserted in the synthetic gather used for the p-τ transform of the wavelet. Another variation is to use an isotropic (direction independent) wavelet as the initial guess. Other ways to initialize the wavelet are well known to persons skilled in the art.

An initial estimate for the background P-wave quality factor, $Q_p$, is made (reference numeral 212). $Q_p$ is a dimensionless ratio between the real and complex parts of the P-wave velocity. Preferably, the initial models are constant $Q_p$ models (i.e., the P-wave quality factor has the same numerical value for all lateral locations and all depth locations beneath the water bottom). In the Gulf of Mexico, an estimate of 100 appears to be a good first guess. In other areas of the world, higher or lower values may be required.

At reference numeral 214 the forward mapping or seismic modeling process is used to produce synthetic p-τ seismic gathers at the same slowness values as appear in the actual p-τ seismic data (at the well location). Inputs to this process are the initial wavelet estimate (reference numeral 210), the initial $Q_p$ estimate (reference numeral 212), and the edited and corrected wellbore measurements and the $V_{int}$ model obtained from the seismic data (reference numerals 146 and 172, respectively). The edited and corrected wellbore measurements (reference numeral 146) are smoothed over a distance of 300 to 500 feet to produce a model of the background P-wave velocity, background S-wave velocity, and background density. The high frequency residuals (the difference between the smoothed values and the original measured values) are used to produce the three elastic ratios $l_{vp}$, $l_{vs}$, and $l_\rho$ defined earlier. Since the well measurements only sample a portion of the vertical earth column, the missing values of $V_p$ (above the first logged depth) are taken from the seismically-derived $V_{int}$ model (reference numeral 172). Missing density values are supplied by Gardner's relation and missing S-wave velocity values are supplied by the mudrock relation. Basement estimates of the elastic parameters are inserted below the logged values.

At reference numeral 218, a modeling comparison is conducted between the computed synthetic seismic gather (reference numeral 214) and the actual seismic data at the well location (reference numeral 216). The purpose of this comparison is to produce a model of the P-wave quality factor (reference numeral 220). A visual comparison is made between the computed model(s) and the pre-stack seismic gather(s). By comparing such details as amplitude and frequency-content decay with reflection depth, a judgement can be made as to which attenuation model provides the best match to the actual seismic data. By far the most useful indicators are the loss of amplitude and frequency content over the logged interval. This confirms the importance of providing an adequate depth interval when stipulating the logging program to be used on any potential calibration wells. Experience indicates that $Q_p$ models differing on average by ten percent will display visibly different amplitude and frequency-content decays.

The best-fit value of $Q_p$ determined by this procedure should generally agree with the physical $Q_p$ determined by other means. However, the seismic data processing (pre-stack migration and noise suppression steps) can mildly influence the result.

Another method of determining the best-fit background $Q_p$ is to perform a number of inversions with different $Q_p$ values. The $Q_p$ value producing the best match to the original (unweighted) data should be the optimum $Q_p$ value. Note that the unweighted data should be used to determine the best $Q_p$ because the weights are $Q_p$ dependent. Another way of getting $Q_p$ is from VSP data, if available.

Use of the Adjoint Map to Fine-Tune the Interval Velocity Model

The interval velocity model produced by the layer-stripping interval velocity analysis (reference numeral 172 in FIG. 3), or by other means, must produce depth consistent reflections as defined by the adjoint map, as set forth above in the background discussion of least-squares inversion. Since both the directional dependence of the initial wavelet estimate (reference numeral 210) and the minimum-phase attenuation model can influence the seismic "flattening" ability of the background P-wave velocity model, another pass at fine-tuning of the interval P-wave velocity should be carried out. (Both wavelet and attenuation model will affect the way in which the adjoint map affects the p-τ seismic data as a function of depth and slowness. As noted above, it is the adjoint map which must be used to flatten the seismic events in solving the normal equations.)

FIG. 5 illustrates the data flow for the adjoint map adjustments. Inputs to the process are the "best-fit" P-wave attenuation model (reference numeral 220) described above, the $V_{int}$ model (reference numeral 172), and the initial wavelet estimate (reference numeral 210). The P-wave attenuation model assumes that the same constant value of average attenuation found at the calibration well location is the correct value to use elsewhere.

At reference numeral 222, the interval P-wave velocity model (reference numeral 172) is used to construct the background models of $V_p(z,Y)$, $V_s(z,Y)$, $\rho(z,Y)$ used in the inversion process. The background $V_p$ is identical to the smoothed $V_{int}$ model. The background $V_s$ model preferably is computed from the $V_p$ model using the mudrock relation. Other methods for determining the background $V_s$ model will be known to persons skilled in the art. The background $\rho$ model is computed from $V_p$ using Gardner's relation.

At reference numeral 224, pre-stack seismic data in the p-τ domain is input into the adjoint map. Only data at the midpoint locations of interest are required. Usually these final adjustments to the P-wave background velocity are done only at one out of twenty midpoint locations. The TRIP inversion software requires that the input p-τ data be sorted into common slowness gathers. The outputs of the adjoint map are sorted back to common midpoint gathers prior to inspection of the final outputs.

At reference numeral 226, the adjoint map is applied to the pre-stack seismic data to produce a pre-stack output. The weight function $W(p,\tau,Y)$ is applied to the data prior to application of the adjoint map to improve data scaling. Three adjoint outputs are produced: the adjoint to $l_{p1}$; the adjoint to $l_{p2}$; and the adjoint to $l_{p3}$. Each adjoint corresponds closely to a pre-stack depth migration (for a layered model) and is labeled by depth, midpoint, and slowness. The adjoints can be combined to produce an adjoint corresponding to the linearized P-wave impedance which should be the most robust parameter. (As will be discussed in more detail below, P-wave impedance is the subsurface property which corresponds to the leading piece of information extracted by solution of the normal equations, and as such it is the most reliable piece of information.) The background P-wave velocity should be checked to make sure that the target reflection event (or events) is flattened to the maximum extent possible by the adjoint mapping.

The background P-wave velocity model usually requires adjustment to obtain maximum possible event "flatness" (reference numeral 228). Usually this can be done by applying a scale factor very close to 1.000 to the background model at each midpoint location in order to achieve the best result. Typically, velocity corrections at this stage are on the order of one percent depending on target depth and maximum offset.

After a trial and error process, a final background model (reference numeral 230) will result. The final background P-wave velocity model resulting from the adjoint map tests is used to produce the final S-wave velocity model and the final density model using the mudrock (or other) relation and Gardner's relation, respectively.

Wavelet and Reflectivity Inversion

The P-wave attenuation model obtained by modeling and comparison at the calibration well, the initial wavelet estimate, the background velocity and density model, and the pre-stack p-τ seismic data are used to solve the least-squares normal equations, first for updates to the initial wavelet model which involves an alternation process described below, and second for an elastic reflectivity inversion (at fixed wavelet) intended to produce the final results used in the calibration and prediction phase of the invention.

FIG. 6 illustrates the data flow for the inversion procedure. The inputs to the procedure are: the initial wavelet estimate (reference numeral 210); the P-wave attenuation model (reference numeral 220); and the background models of P-wave velocity, S-wave velocity, and density (reference numeral 230).

The p-τ seismic data (reference numeral 162 in FIG. 3) resulting from the p-τ transformation is required by the wavelet inversion process at each midpoint location used in the wavelet updates. Depending on the wavelet smoothing function selected, wavelet inversions may or may not be required at each midpoint location at which an eventual elastic inversion will be done. A very narrow wavelet smoothing function will require wavelet updates at all midpoint locations at which an elastic inversion will be done. A very broad (or constant) wavelet smoothing function will permit the wavelet updates to be done only at a few midpoint locations. The use of narrow wavelet smoothing will tend to produce wavelet models which are potentially allowed to vary rapidly with midpoint location. This approach can, under some conditions, be used to reduce certain noises in the data. The TRIP inversion software requires that the input p-τ data be sorted into common slowness gathers.

The wavelet inversion updates are important in achieving the best final fits to the actual seismic data. Without wavelet inversion updates, the reflectivity inversions (reference numeral 238 in FIG. 6) are less stable. This instability, resulting from use of an incorrect wavelet, can result in "unphysical" elastic inversion results. An example of an unphysical result is an inverted profile in which the inverted P-wave velocity variations are nearly exact negatives of the density variations. This is called "anti-correlation." Anti-correlation between P-wave velocity changes and density changes can, of course, be perfectly correct over small portions of a depth profile. However, when P-wave velocity changes and density changes anti-correlate nearly everywhere, such results disagree with the widely observed feature of well measurements to display fairly correlated P-wave velocity and density changes. (Two well logs which tend to increase or decrease at the same depth locations by proportional amounts in the same direction are said to be correlated, and this observation is behind Gardner's relation which approximately predicts density from P-wave velocity, $\rho(z)=C\ V_p^{0.25}(z)$.) Wavelet inversion updates typically improve or eliminate this problem.

The wavelet inversion procedure (reference numeral 232) begins with the application of the weight function to the input pre-stack p-τ seismic data (reference numeral 162). As discussed previously, computation of the weight function requires knowledge of the initial wavelet estimate (reference numeral 210), the P-wave quality factor (reference numeral 220), and the background model of $V_p$, $V_s$, and $\rho$ (reference numeral 230). In order to succeed, the wavelet inversion process requires numerous reflection events in each gather in order to separate the effects of wavelet variations from the effects of reflectivity variations. Wavelet inversion applied to narrow, target oriented reflection zones will not succeed because no physical mechanism exists for separating out wavelet effects from reflectivity effects.

The wavelet inversion process (reference numeral 232) requires a joint inversion for wavelet updates and elastic reflectivities. Since the forward map used in the preferred embodiment (the convolutional model) involves a convolution of the seismic wavelet with the reflectivities, wavelet inversion is a non-linear inversion process (both wavelet updates and reflectivities are unknowns). Reflectivity inversion at a fixed wavelet, on the other hand, is a linear inversion process because the forward map is a linear function of the desired reflectivity updates. The wavelet inversion is accomplished by using the method of alternation. This means that first a reflectivity inversion is done using the initial wavelet estimate to obtain an initial estimate of the elastic reflectivities. After an approximate reflectivity model is obtained, a wavelet inversion is performed holding the reflectivity model fixed. This alternation proceeds back and forth between reflectivities and wavelet updates until further alternations fail to achieve any worthwhile improvements. The number of alternations required is data dependent as are the amount of damping and the number of inner loop iterations used to solve (approximately) the normal equations. Typically, four wavelet alternations selected on the basis of comparisons between final inversion results and well measurements carried out at the calibration well are sufficient; however, either more may be used if necessary or less may be used if sufficient. Each wavelet alternation consists of ten to twenty inner loop iterations for reflectivity inversion at fixed damping (reflectivity damping usually starts at five to ten percent and decreases to one-half or zero percent at the last stage), followed by ten to twenty inner loop iterations for wavelet inversion at fixed damping (usually the wavelet damping is one-tenth of the reflectivity damping). Elastic parameter resets might be used between some of the early alternation stages. The best wavelet inversion procedure to follow is data dependent and should be tuned to produce the best results at the calibration well. A successful wavelet inversion procedure results in an updated wavelet model (reference numeral 234) at midpoint locations of interest over the calibration and target locations.

The new, updated wavelet model (reference number 236) is passed on to the reflectivity inversion step (reference numeral 238). Other inputs to the inversion are: the background attenuation model (reference numeral 220); the background model of $V_p$, $V_s$, and $\rho$ (reference numeral 230); and the time migrated, p-τ transformed, pre-stack seismic data (reference numeral 162) for all midpoint locations of interest. As noted previously, the TRIP software requires that the input p-τ data be sorted into common slowness gathers.

Elastic inversions (reference numeral 238) at fixed wavelet are carried out at all midpoint locations of interest over both the calibration and target locations. Typically, fifty to one hundred midpoints over each location are used. In the examples discussed below, the midpoints were arranged to be spaced at every 82 feet which corresponded to an inversion at every fourth original stacking bin. This sampling rate appeared to provide a good representation of the subsurface features. However, other numbers of midpoints and other spacings may be used if desired.

The reflectivity inversion process is similar to the wavelet inversion except that no wavelet updates are done and, therefore, no alternations are needed. The reflectivity inversions are a linear inversion process in the preferred embodiment because the convolutional model is used. In more general embodiments, which include multiples, reflectivity inversion is not a linear process. In this situation, there are many additional complications. For example, the scales of the data and the source estimates become important. These scales become part of the inversion process and must be found from the data or explicitly measured during the data recording process. Correct scales will achieve not only good fits of the primary reflection energy, but also elimination of multiple reflections from inverted models through incorporation of the multiples in the underlying model. Needless to say, incorporation of the multiples in the inversion process adds both difficulty and expense.

The reflectivity inversions are applied to the pre-stack seismic data which has been re-scaled by the weight function described earlier. The reflectivity inversions usually involve five to eight stages of inner loop iterations with ten to twenty inner loop iterations per stage. The number of stages used, the number of inner loop iterations, the elastic variables employed, the degree of damping, and the elastic parameter resets between the stages used during the inversion process must be carefully selected based on study of the inversion process at the calibration well. The examples described below used elastic parameter choice set forth in equation (56) above. Damping usually begins at five to ten percent of the seismic data energy and falls to one-half percent or zero percent of the data energy at the last stage. These issues are data dependent and will vary according to the detailed objectives of the inversion project. In most situations, approximately eighty to one hundred inner loop iterations spread among five or six inversion stages have been used. The convolutional model used in the preferred embodiment will succeed in fitting 35% to 75% of the energy of the pre-stack seismic data to physical subsurface elastic models. The majority of the energy remaining in the unfit portion of marine seismic data (called the data "residual") is typically identified as multiples. Outputs of the reflectivity inversion process are the "best-fit" subsurface elastic models (reference numeral 240) and the final data residual (reference numeral 242) which is the difference between the input data and the best-fit model. The inversion process produces three inverted elastic parameter profiles (versus depth) at each midpoint location inverted. These are the dimensionless ratios:

$$l_{vp}(z,Y) = \frac{\Delta V_p(z,Y)}{V_p(z,Y)} \tag{63}$$

$$l_{vs}(z,Y) = \frac{\Delta V_s(z,Y)}{V_s(z,Y)} \tag{64}$$

$$l_{\rho}(z,Y) = \frac{\Delta \rho(z,Y)}{\rho(z,Y)} \tag{65}$$

From these three results the P-wave and S-wave impedances and $V_p/V_s$ ratios may be obtained:

$$l_{zp}(z,Y) = \frac{\Delta Z_p(z,Y)}{Z_p(z,Y)} \approx l_{vp}(z,Y) + l_{\rho}(z,Y) \tag{66}$$

$$l_{zs}(z,Y) = \frac{\Delta Z_s(z,Y)}{Z_s(z,Y)} \approx l_{vs}(z,Y) + l_{\rho}(z,Y) \tag{67}$$

$$l_{vp/vs}(z,Y) = \frac{\Delta(V_p(z,Y)/V_s(z,Y))}{(V_p(z,Y)/V_s(z,Y))} \approx l_{vp}(z,Y) - l_{vs}(z,Y) \tag{68}$$

The approximately equals sign ($\approx$) means that the equality becomes exact only as the high frequency variations become vanishingly small relative to the background or low frequency variations (in other words, when $\Delta V_p/V_p \ll 1$, $\Delta V_s/V_s \ll 1$, $\Delta \rho/\rho \ll 1$). The final output inverted sections used in the interpretation process are obtained by using the inverted parameter estimates to model the normal-incidence or reflectivity section for each elastic parameter:

$$\hat{P}_{vp}(0,\omega,Y) = \hat{S}_0(\omega)(-i\omega) \sum_{i=1}^{Nlayer} d_{layer} e^{i\omega\tau_{pp}(0,z_i,Y)} l_{vp}(z_i,Y) \tag{69}$$

$$\hat{P}_{vs}(0,\omega,Y) = \hat{S}_0(\omega)(-i\omega) \sum_{i=1}^{Nlayer} d_{layer} e^{i\omega\tau_{pp}(0,z_i,Y)} l_{vs}(z_i,Y) \tag{70}$$

$$\hat{P}_{\rho}(0,\omega,Y) = \hat{S}_0(\omega)(-i\omega) \sum_{i=1}^{Nlayer} d_{layer} e^{i\omega\tau_{pp}(0,z_i,Y)} l_{\rho}(z_i,Y) \tag{71}$$

$$\hat{P}_{zp}(0,\omega,Y) = \hat{S}_0(\omega)(-i\omega) \sum_{i=1}^{Nlayer} d_{layer} e^{i\omega\tau_{pp}(0,z_i,Y)} l_{zp}(z_i,Y) \tag{72}$$

$$\hat{P}_{zs}(0,\omega,Y) = \hat{S}_0(\omega)(-i\omega) \sum_{i=1}^{Nlayer} d_{layer} e^{i\omega\tau_{pp}(0,z_i,Y)} l_{zs}(z_i,Y) \tag{73}$$

$$\hat{P}_{vp/vs}(0,\omega,Y) = \hat{S}_0(\omega)(-i\omega) \sum_{i=1}^{Nlayer} d_{layer} e^{i\omega\tau_{pp}(0,z_i,Y)} l_{vp/vs}(z_i,Y) \tag{74}$$

These equations identify the fine-layer approximation to the normal-incident P-wave reflection coefficient evaluated at depth z as a product of $l_{zp}$ (z, Y) with the frequency factor ($-i\omega$). This means that the result of equation (72) is the fine-layer generalization of equation (5). By analogy, equation (69) is the generalization of equation (1); equation (70) is the generalization of equation (2); equation (71) is the generalization of equation (3); equation (73) is the generalization of equation (7); and equation (74) is the generalization of equation (8).

The wavelet used in this modeling step ($S_0(\omega)$) is selected to enhance the interpretability of the resulting sections. Typically, a zero-phase wavelet is used. The best wavelet to use is data dependent and it may be selected in order to facilitate comparisons with other geophysical data such as well measurements. The selected wavelet corresponding to $S_0(\omega)$ might include low-pass filtering used to reduce noises in the final output inversion results. These issues are well known to persons skilled in the art. The output displayed sections are obtained by using the inverse Fourier transform to return to the time domain. The output section corresponding to the P-wave impedance ($P_{zp}(0,\tau,Y)$) closely resembles a zero-phase stack. The output sections corresponding to the other elastic parameters are the zero-phase stacks that would result if the normal-incident P-wave reflection coefficients (the fractional changes in P-wave impedance) were replaced by the fractional change in P-wave velocity, S-wave velocity, density, S-wave impedance, and $V_p/V_s$ ratio.

More General Embodiments

More general embodiments of the invention do not use the p-$\tau$ transform. In the low dip case, the data are processed in common offset gathers containing all midpoint locations of interest instead of common slowness gathers. Ray-tracing is used to compute the reflection times, reflection angles, and ray-path lengths. In the high dip (general) case, the data are processed in common shot gathers containing all detector locations of interest. Finite difference or Kirchoff methods are used to compute the forward, adjoint, and normal maps. As mentioned previously, in the general case pre-stack time or depth migration (reference numeral 122 in FIG. 2) is not used in the pre-processing phase of the invention.

The Calibration and Interpretation Phase

The calibration and interpretation phase of the invention (reference numeral 300 in FIG. 1) uses the relative magnitudes and behaviors of elastic inversion reflectivity results from the pre-stack inversion phase to predict gas/oil saturations at the target location. The calibration and interpretation procedure consists of scaling one inversion result based on another so that the resulting "picture" of the inverted results is independent of such things as the original seismic data scaling and some aspects of wave propagation above the target reflection (such as uncorrected structural effects and unaccounted for P-wave attenuation). Alternatively, scaling may be based on the actual or assumed outgoing energy from the seismic source. Two scaling methods have been used:

1. Color plots normalized to the target event P-wave impedance or P-wave velocity variations, and
2. Ratio value plots using elastic reflectivity measures at the target event.

Figure 7:
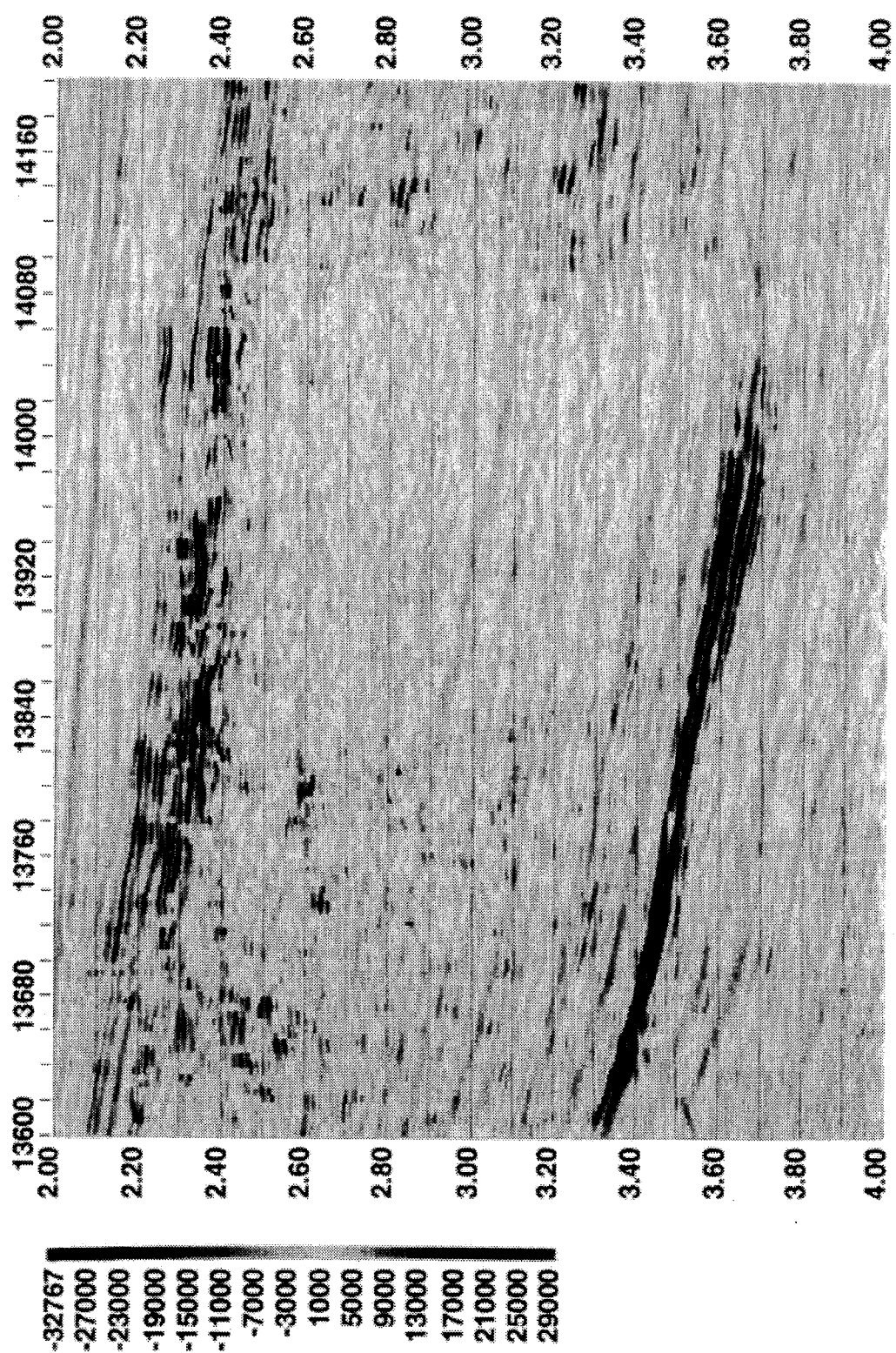
FIG. 7 shows a color plot of P-wave velocity reflectivity versus P-wave two-way normal incidence traveltime for line 1 of the example scaled so that the maximum P-wave velocity reflectivity value on the target reflection is approximately 32,760.

Both methods involve the zero-phase output elastic sections. The output P-wave impedance or P-wave velocity section closely resembles a zero-phase stack section. As an illustration, FIG. 7 shows the P-wave velocity reflectivity section for a 2D seismic line in the Gulf of Mexico (line 1). The vertical axis is P-wave two-way normal incidence reflection time. The horizontal axis is midpoint location along the profile line. The area depicted in FIG. 7 corresponds to approximately 12,300 feet of midpoint locations. The displayed colors are related to the strength and sign of the plotted amplitudes as shown in the color bar. Displays of this kind are well known to persons skilled in the art. This color section has been scaled so that the deep red color followed by a deep blue color corresponds to a large negative change in the P-wave velocity. The scale factor was chosen so that the maximum P-wave velocity reflectivity amplitude variation at the target reflection was approximately 32,768. In this area of the Gulf of Mexico, such "bright" seismic amplitudes often correspond to the presence of gas and/or oil in sand layers. An exploration well at midpoint location 13,900 found gas and oil in the zone 3.500 seconds to 3.700 seconds. As clearly seen on this section, amplitude brightness is not the sole criterion used to make drilling decisions. (There are other bright reflection horizons visible on this section. The criteria used to evaluate hydrocarbon prospects include many factors. Among these are geologic structure, stratigraphy, visible fluid contacts, correlation between structure and bright seismic amplitude, as well as hydrocarbon source and seal.)

Figure 8:
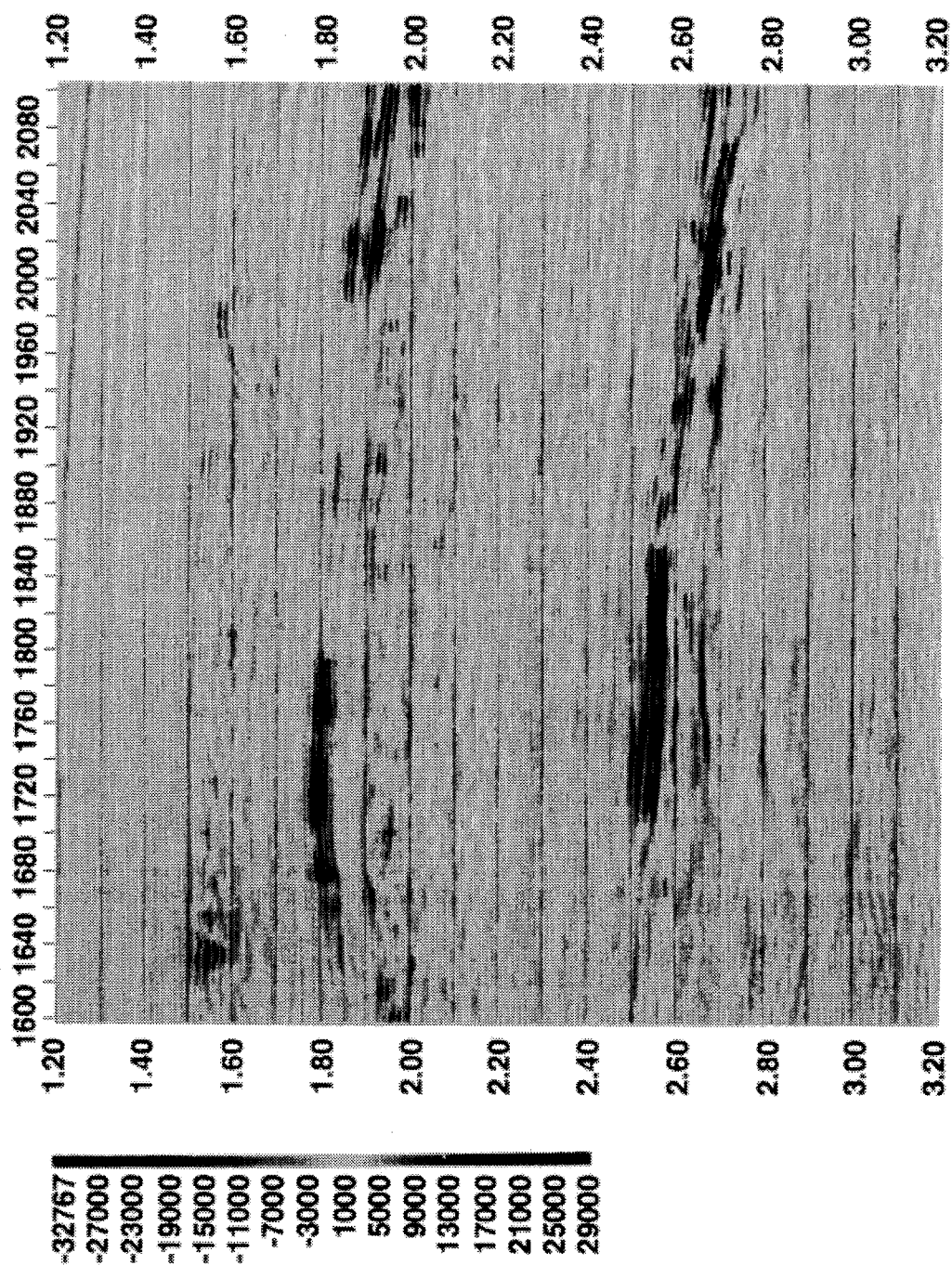
FIG. 8 shows a color plot of P-wave velocity reflectivity versus P-wave two-way normal incidence traveltime for line 2 of the example scaled so that the maximum P-wave velocity reflectivity value on the target reflection is approximately 32,760.

FIG. 8 shows another seismic profile line (line 2) displaying the seismically inverted P-wave velocity reflectivity displayed in the same way as in FIG. 7. FIG. 8 was scaled so that the maximum P-wave velocity reflectivity on the target reflection was again close to 32,768. The target reflection event is between 2.500 seconds and 2.600 seconds. The area depicted in FIG. 8 corresponds to approximately 10,250 feet of midpoint locations. Every effort has been made to apply an identical inversion process to both line 1 and line 2. Thus, line 1 serves to calibrate line 2. A five stage inversion procedure was used. Again, the P-wave velocity reflectivity (or the P-wave impedance reflectivity which looks almost the same as the P-wave velocity reflectivity) shows "bright" amplitudes—in fact, even brighter than on line 1 (as judged by the relative strength of the target relative to the background). Drilling at midpoint location 1824 found low gas saturation (i.e., gas in non-commercial quantities).

From this example, it is clear that the P-wave velocity reflectivity alone cannot distinguish between low gas saturation and commercial gas and oil in the reservoir. However, the present invention can be used to detect a difference between the presence and absence of commercial hydrocarbons by examining the reflectivities from other elastic properties. For example, the density reflectivities can be used to distinguish between low gas saturation and high gas saturation.

Figure 9:
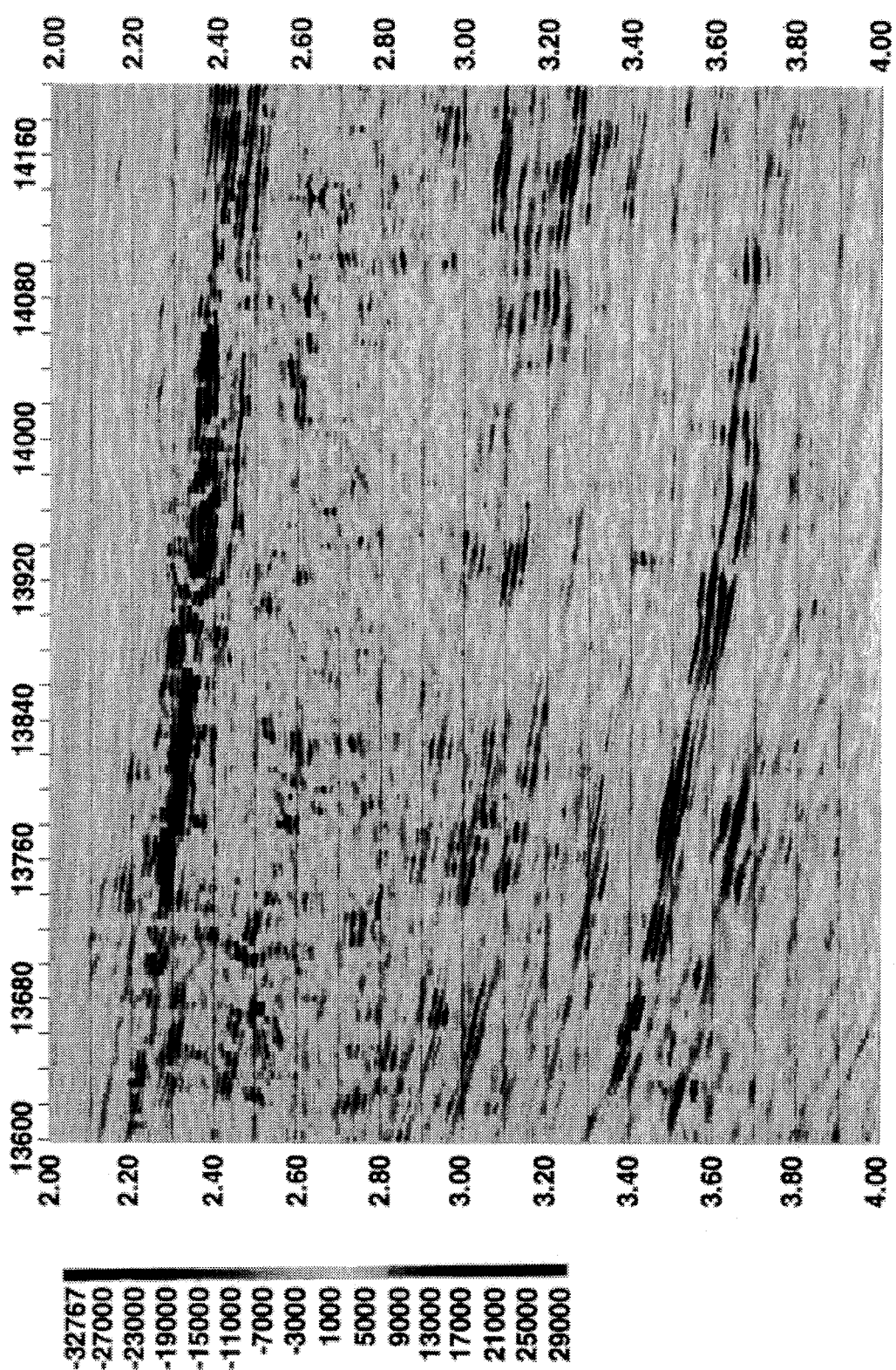
FIG. 9 shows a color plot of the density reflectivity versus P-wave two-way normal incidence traveltime for line 1 of the example scaled with the same factor as FIG. 7.
Figure 10:
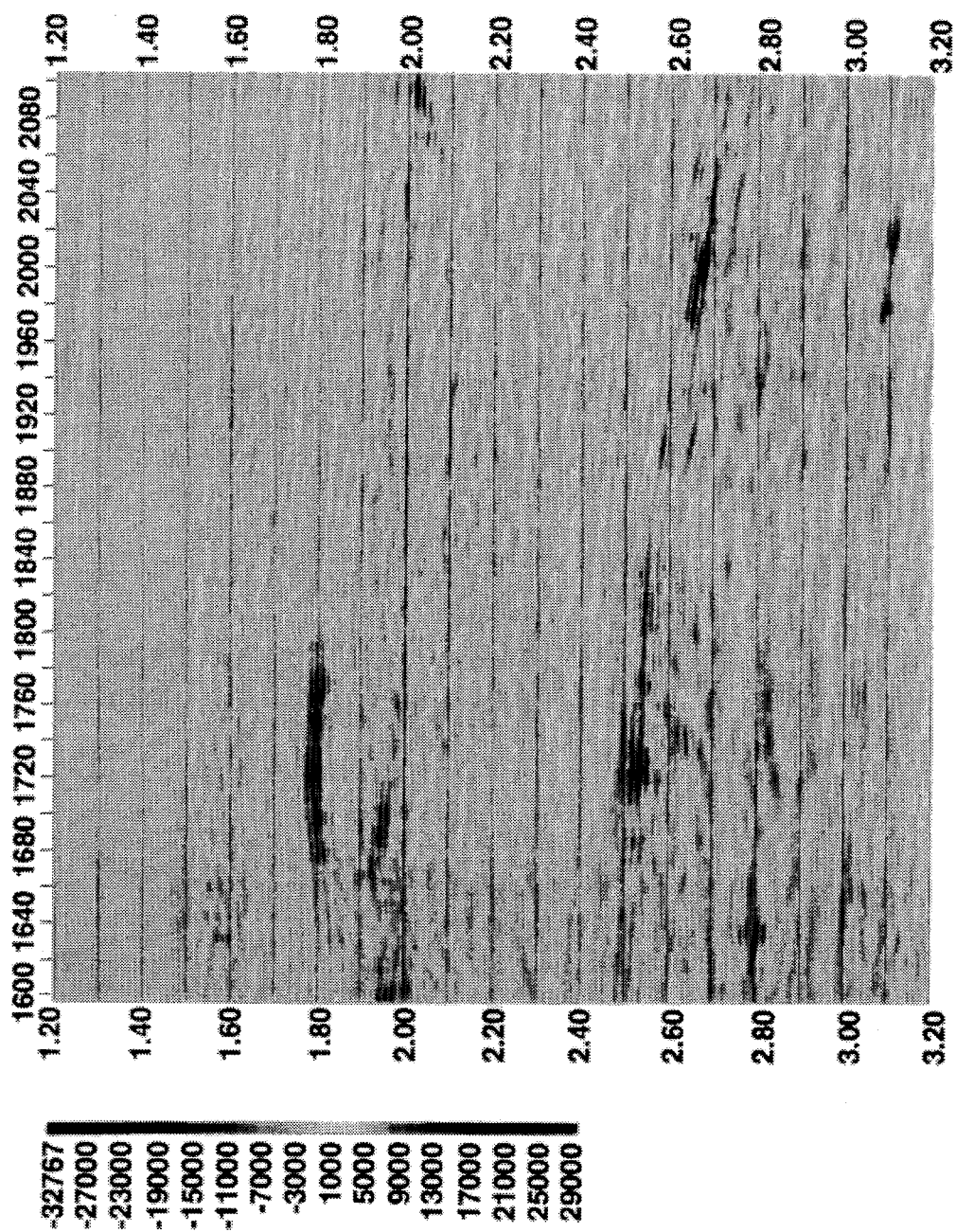
FIG. 10 shows a color plot of the density reflectivity versus P-wave two-way normal incidence traveltime for line 2 of the example scaled with the same factor as FIG. 8.

FIG. 9 shows the density results obtained from line 1 scaled with the same factor as in FIG. 7. FIG. 10 shows the density results obtained from line 2 scaled with the same factor as in FIG. 8. (One scale factor for both line 1 results, another scale factor for both line 2 results.) The density results, scaled in this way, show a big difference between the two lines. This difference is visible only by using properly scaled results. Scaling the density sections against their own backgrounds would not show these differences. Well measurements made in the two exploration wells, confirm the general correctness of the correlation between commercial gas/oil saturation and "bright" density values when the density variations are viewed as relative to the P-wave velocity reflectivity. Note in particular that the density reflectivity results for line 2 do not display any "bright" amplitudes over the same midpoint locations where the P-wave velocity reflectivities are bright. The inverted results suggest that line 2 displays a P-wave velocity reflectivity anomaly, but no density reflectivity anomaly. The inverted results for line 1 suggest both a P-wave velocity reflectivity anomaly and a density reflectivity anomaly. (When the P-wave velocity—or P-wave impedance—reflectivities do not display anomalous behavior no seismic bright spot exists, and the reflection event is considered less likely—relative to a bright spot—to contain hydrocarbons.) On these two lines, the inverted S-wave velocity reflectivities were numerically small and low frequency in appearance. Thus, the shear results did little to add to the analysis.

As expected, the inversions discussed above show that the P-wave impedance variations are the most successfully predicted parameter, the P-wave velocity variations are the next most successfully obtained parameter, and the density variations appear to be the third or fourth on this list, and the S-wave impedance variations fourth or third (depending on what criteria are used), and the S-wave velocity fifth. The S-wave velocity variations are systematically too small in magnitude by one or two hundred percent and the density variations are systematically too large. To a certain degree, these two errors cancel when the S-wave impedance variations are computed. In other inversion tests, elsewhere in the world, it has been found that the density variations can turn out to be systematically too small (and low frequency). In this situation, interesting results are obtained by looking at the variations in the $V_p/V_s$ ratio scaled against the P-wave impedance variations (or the P-wave velocity variations which were almost the same thing since density variations were small).

Another presentation of these results, which is more purely numerical, consists of examination of the ratio values of the inverted parameters along the target location of interest. To produce these plots we interpret the separate inverted sections in order to locate the wavelet cycle which follows the reflection signature of maximum interest (which can be either the top, base, or other reflection event, as desired). Synthetic normal-incident traces computed from well measurements can be useful in confirming this interpretation. Care must be used to follow the same geologic feature in all six inverted sections. The selected reflection cycle is followed (approximately) horizontally across the target reflection and the seismic amplitudes are extracted. A number of amplitude attributes within a data window of approximately one pulse width (0.020 to 0.050 seconds) can be extracted, such as:

1. Maximum positive amplitude value,
2. Minimum negative amplitude value,
3. Average amplitude value across the wavelet half cycle containing the maximum positive value,
4. Average amplitude value across the wavelet half cycle containing the minimum negative value,
5. Integrated amplitude value across the wavelet half cycle containing the maximum positive value, and
6. Integrated amplitude value across the wavelet half cycle containing the minimum negative value.

Figure 11:
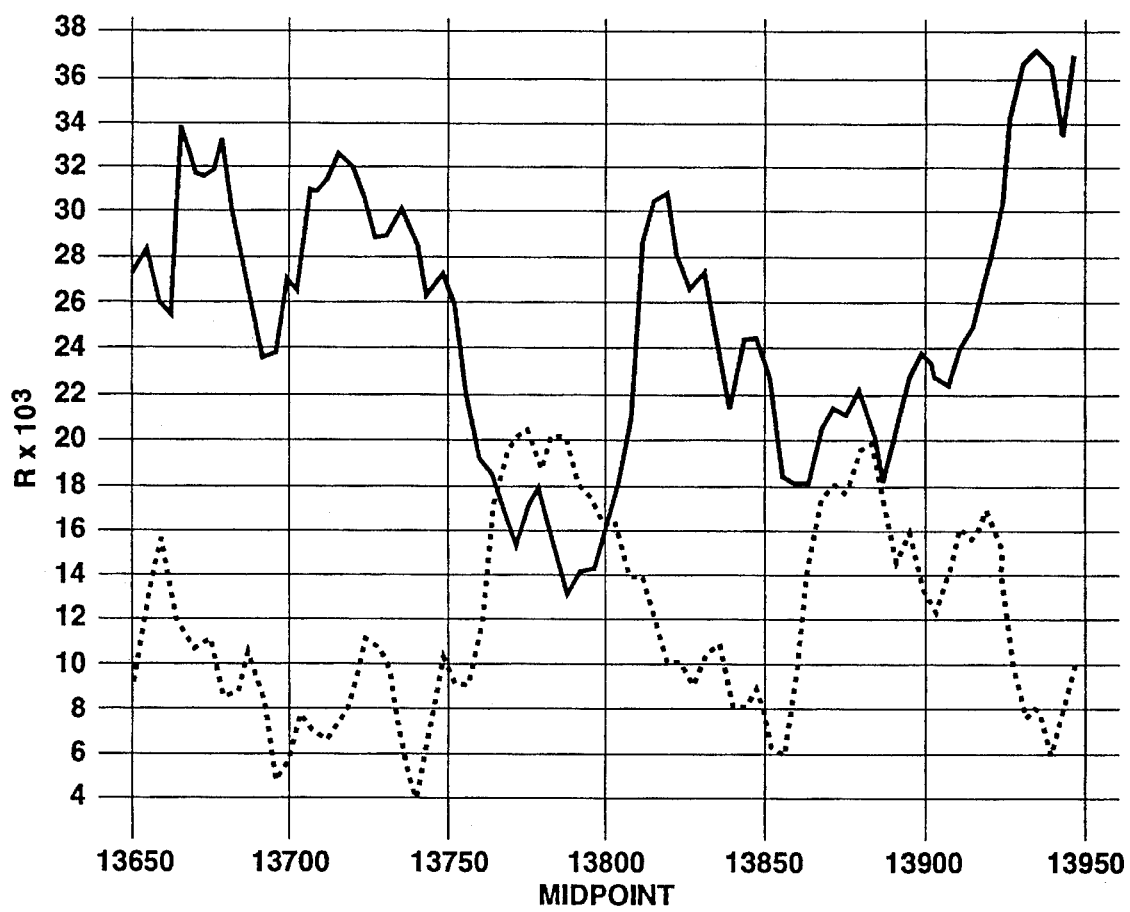
FIG. 11 shows the P-wave velocity reflectivity (solid line) and density reflectivity (dashed line) values along the target horizon for selected midpoint locations on line 1.
Figure 12:
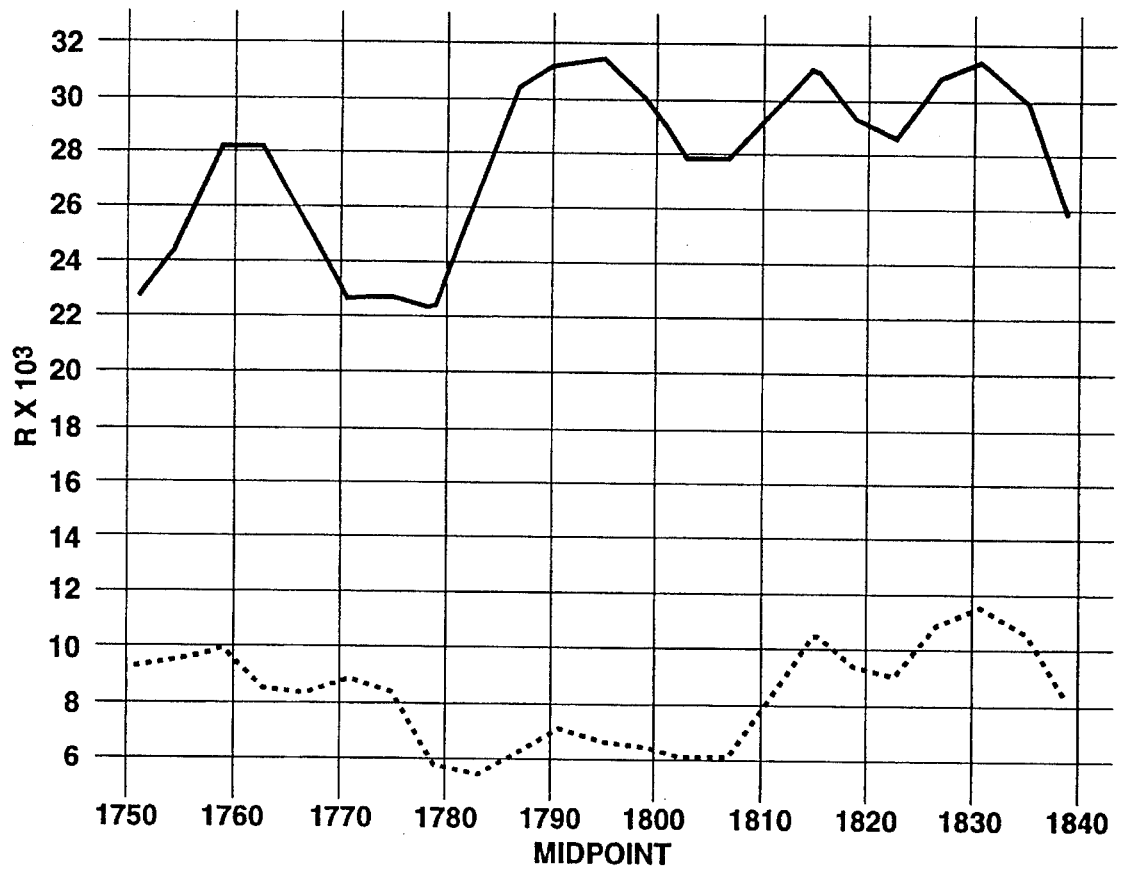
FIG. 12 shows the P-wave velocity reflectivity (solid line) and density reflectivity (dashed line) values along the target horizon for selected midpoint locations on line 2.

Amplitude extractions of this kind are very well known to those skilled in the art. This procedure can be followed for each of the six elastic sections mentioned. Which of the six amplitude measures listed above are actually used in the analysis depends upon the expected hydrocarbon signature, upon the noise level of the data (maximum/minimum measures are more noise sensitive, and integrated values are more robust), and upon the required level of resolution (maximum/minimum measures have the most resolution in a thin bed case). Whatever measure is selected is always employed in making all subsequent data comparisons. Normal-incidence modeling at the calibration well location using well measurements can be useful in determining the proper choice of reflection measure. This procedure produces a measure of the reflectivity at the target location for each of the elastic parameters. These results can be displayed as a function of midpoint. FIG. 11 displays the P-wave velocity and density reflection strengths for line 1 (using the maximum positive amplitude value after applying a negative overall wavelet factor so that FIG. 11 displays decreases in P-wave velocity and density at the target location). Displays of reflectivity versus midpoint location are well known to those skilled in the art. FIG. 12 displays the same for line 2. It can be seen that the line 1 results have larger density reflectivity strength (relative to velocity reflectivity) than line 2. It can also be seen that there is substantial variation in these inverted values, and that there is some tendency for these curves to display a mirror-like variation with respect to each other (this is seen in the line 1 results in particular). This instability is a reflection of the fact that while the variations in P-wave impedance are fairly free of noise corruption, the separated elastic parameters of variations in P-wave velocity and density are more sensitive to noises. Once again it should be emphasized that these techniques are data dependent.

Figure 13:
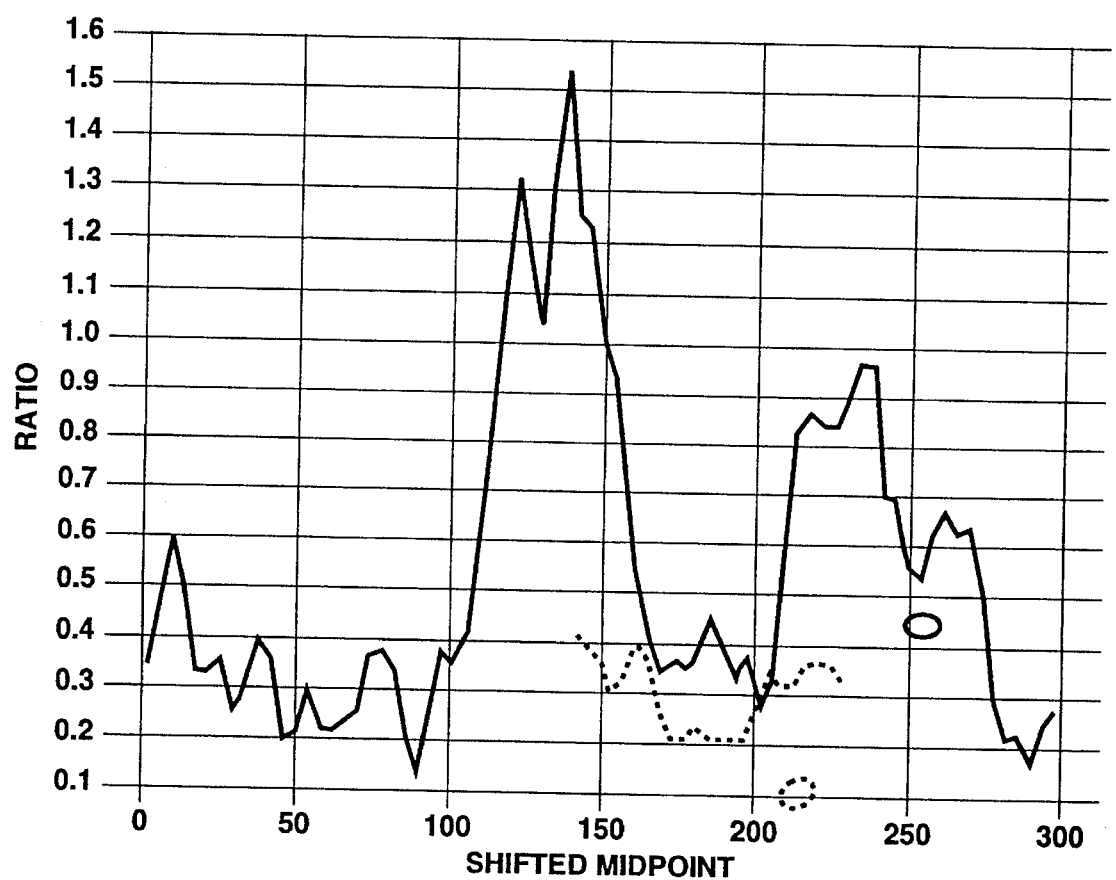
FIG. 13 shows ratio values of density reflectivity to P-wave reflectivity for the target horizons for line 1 (solid line) and line 2 (dashed line)

A more compact way of presenting the results of the inversion consists of displaying the ratios of the separate extracted reflection strengths. Typically, ratios which place the more stable parameters in the denominator are chosen. FIG. 13 displays the computed ratios of $R_{dn}(Y)/R_{vp}(Y)$ for the two lines. These values are displayed only over the most stable portion of the target reflections. FIG. 13 shows the line 1 results as a solid line and the line 2 results as a dashed line. Midpoint locations have been shifted, but both lines show inversion results obtained at every 82 feet. Prior to the present invention, displays of this type and predictions of hydrocarbon content based on comparison of elastic inversion results for target and calibration locations were unknown.

On average, the line 1 results are two to three times the magnitude of the line 2 results, but line 1 shows large variations. These variations may be traced to the same instability mentioned above. The dip in the ratio values seen on the line 1 results (solid curve) between shifted midpoints 150 to 200 correspond to the dim density variations around midpoint location 13820 (see FIG. 9). Some evidence is seen in the P-wave velocity variation results (FIG. 7) suggesting that shallower features might be responsible for perturbation of the reflected seismic energy around this location. Another explanation may be that there are indeed changes in the reservoir properties at this location (i.e., the variations in the ratio value are associated with important changes in the target zone). Great care must be used in examining results of this kind, and it is expected that these ratio values will be indicative of hydrocarbons only when the ratio values are computed over "bright" reflectors. Since least-squares inversion methods weight things according to the energy of the event, low amplitude features will display larger inversion errors.

Figure 14:
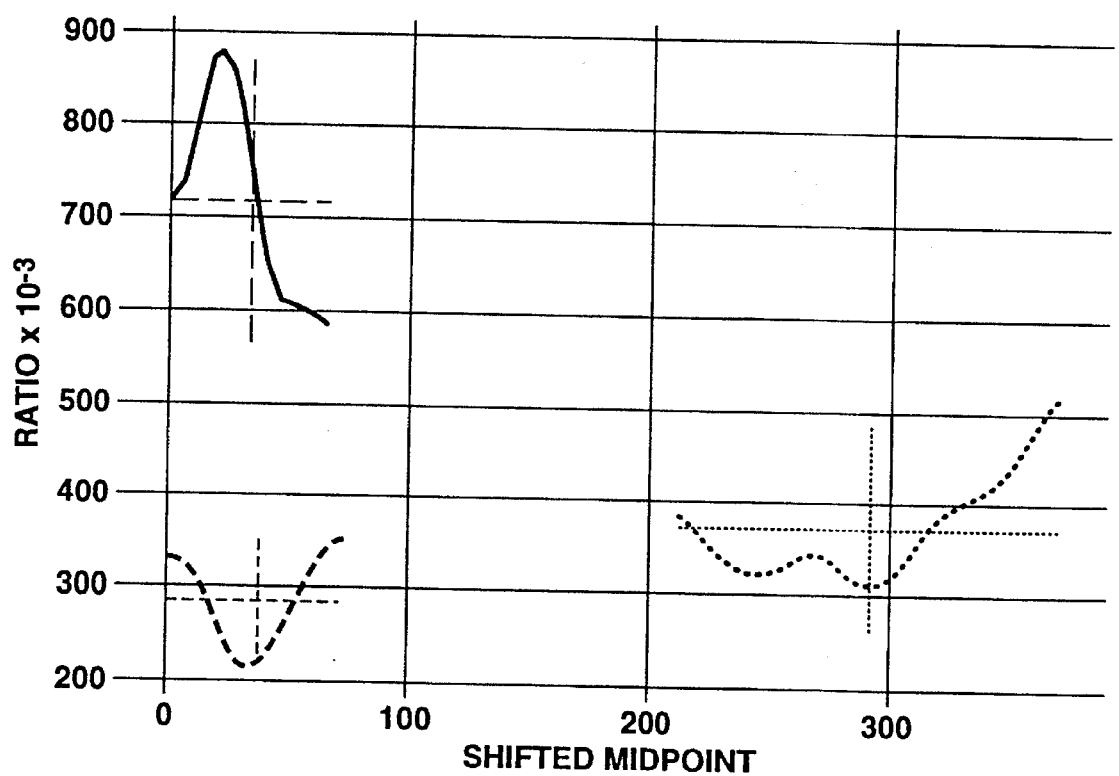
FIG. 14 shows ratio values of density reflectivity to P-wave reflectivity for the target horizons for line 1 (solid line), line 2 (dashed line), and line 3 (dotted line) of the example using only midpoint locations thought to have consistent fluid type.

FIG. 14 illustrates the predictive nature of the present invention. FIG. 14 compares ratios of density and velocity reflectivities at the target location for lines 1 and 2 and a third line (line 3) from a location in the vicinity of lines 1 and 2. It is desired to predict the drilling results for line 3 based on the line 1 and the line 2 results. Line 3 has been inverted using a six stage inversion process which gave the best results at a nearby calibration well. The calibration well contained gas but displayed low values of the $R_{dn}/R_{vp}$ indicator due to poor reservoir quality. The inverted results at the calibration well agreed with the well values. Line 3 (not shown) has bright amplitudes for inverted variations in P-wave impedance and P-wave velocity at the target location, just like lines 1 and 2. In FIG. 14, some horizontal smoothing has been applied to the ratio results. The solid curve is from line 1, the dashed curve is from line 2, and the dotted curve is from line 3. Lines 1 and 2 are being used as the calibration sites in this case. In FIG. 13, the well measured values of $R_{dn}/R_{vp}$ are marked (at the well locations) by circles. Every attempt has been made to display only the portions of the target locations which contain the same fluid. Thus, the solid curve covers the gas saturated portion of the line 1 target, the dashed curve covers the low gas fluid of line 2, and the dotted curve appears to cover a portion of the line 3 target which should contain a single fluid type. The horizontal line plotted with each data curve shows the average value for that curve. The vertical line shows the variance. At the time these curves were obtained, the line 3 target was undrilled. Based on the FIG. 14 results, it was predicted that the line 3 target would not contain significant gas saturation. As mentioned before, a nearby calibration well contained gas, but it was not used in the final prediction phase because of poor reservoir quality which resulted in low values of $R_{dn}/R_{vp}$. Eventual drilling results of the line 3 target found low gas saturation.

The variances of the line 1, line 2, and line 3 curves (computed from the unsmoothed ratio values), confirm that the line 3 values are statistically separated from the line 1 values. On the other hand, lines 2 and 3 are not statistically separate. Obviously, these variances can be used as a guide to determine the confidence level in the predictions made using the present invention.

The present technique (i.e., using one wave equation based inversion result to scale another inversion result leading to the concept of wave equation/inversion-based hydrocarbon indicators) for comparing multi-parameter inversion results to make predictions about the presence or absence of certain types of hydrocarbons was heretofore unknown. Good inversion results and good understanding of the influence of rock and fluid saturation properties are clearly very important to the success this technique can achieve in any particular application. When properly applied, the present invention tends to correlate high values of ratios of this kind with the presence of hydrocarbons (gas and oil). Lower ratio values tend to correlate with low gas saturation and/or poor reservoir quality. Reservoir quality enters as an additional degree of complexity because even known gas reservoirs will not always display high wellbore-measured values of $R_{dn}/R_{vp}$. A lower value may occur in shaley reservoir sands (a sand unit is said to be shaley if it contains significant fine interbedding of sand and shale rock types). In such situations, the pre-stack elastic inversion results correlate with the well measurements (in other words, the inversions show low values of the $R_{dn}/R_{vp}$ indicator even when gas saturation is known to be present).

A final, and even more compact, view of the inversion results is obtained from a comparison of averages of the ratio values at each midpoint location based upon the inversion data residual (reference numeral 242 in FIG. 6) at that midpoint and target location. (The magnitude of the difference between the data and the final inversion model can be used as a confidence measure. In this situation, the residual around the target reflection event would be windowed using the background velocity to adjust the window as a function of slowness.)

In the 3D situation, these procedures generate inversion results and ratio estimates over 2D surfaces instead of across line segments. Otherwise, the same concepts can be applied to guide the analysis and prediction steps.

Lithology predictions using the present invention follow the same general principles as predictions of fluid saturation:
1. An elastic-property signature is identified through an understanding of rock properties.
2. Inversion modeling at a calibration location is used to confirm the identified lithologic signature.

3. Inversion results at both the calibration and target locations are compared to predict the lithologic properties at the target location.

The invention is not to be unduly limited to the foregoing which has been set forth for illustrative purposes. On the contrary, a wide variety of modifications and alternative embodiments will be apparent to persons skilled in the art without departing from the true scope of the invention, as defined in the claims set forth below.

Symbols Table

| Symbol | Description |
|---|---|
| $A(p,X)$ | the Fréchet derivatives of the model as a matrix at slowness p and model X |
| $A^T$ | the transpose of the Fréchet derivative matrix |
| $A_{ij}(p,Y,X)$ | the i-th row and j-th column entry in the Fréchet derivative matrix at midpoint location Y |
| $a_{min}(\omega)$ | minimum-phase function for attenuation |
| $\alpha$ | exponent of slowness p used in the weight function |
| C | coefficient in Gardner's relation between density and P-wave velocity |
| $D(p)$ | data vector |
| $D(p,\tau,Y)$ | the p-τ data at slowness p, intercept time τ, and midpoint location Y |
| d | least-squares damping weight |
| $d_{layer}$ | the depth sample rate of the thin layered model |
| $\delta l_{vp}(z,Y)$ | update in $l_{vp}$ at depth z and midpoint location Y |
| $\delta l_{vs}(z,Y)$ | update in $l_{vs}$ at depth z and midpoint location Y |
| $\delta l_p(z,Y)$ | update in $l_p$ at depth z and midpoint location Y |
| $\delta s$ | collection of all source updates |
| $\delta s_i(\tau,[\ ],[\ ],Y_i)$ | update in $s_i$ at source delay τ and midpoint location $Y_i$ |
| $\delta X$ | the update to the model vector |
| $\delta X_j$ | the j-th component of the update to the model vector |
| $\Delta V_p$ | the high frequency part of the P-wave velocity |
| $\Delta V_s$ | the high frequency part of the S-wave velocity |
| $\Delta \rho$ | the high frequency part of the density |
| $\Delta p$ | the slowness sample rate |
| $\Delta \tau$ | the intercept time sample rate |
| $\Delta \omega$ | the frequency sample rate in radians per second |
| e | the base of natural logarithms |
| $\epsilon$ | exponent used to weight source coefficients |
| $E(p,h_w,Y)$ | elastic factor in the mud layer at depth $h_w$ and midpoint location Y as a function of slowness p |
| $h_w$ | depth from air-water interface to the water bottom |
| I | the unit matrix |
| i | the unit imaginary number (the square-root of −1) |
| J[...] | the least-squares objective |
| L | lower depth location |
| $l_{vp}(z,Y)$ | ratio of high-frequency P-wave velocity to background value at depth z and midpoint location Y |
| $l_{vs}(z,Y)$ | ratio of high-frequency S-wave velocity to background value at depth z and midpoint location Y |
| $l_p(z,Y)$ | ratio of high-frequency density to background value at depth z and midpoint location Y |
| $l_{p1}(z,Y)$ | generic first parameter at depth z and midpoint location Y |
| $l_{p2}(z,Y)$ | generic second parameter at depth z and midpoint location Y |
| $l_{p3}(z,Y)$ | generic third parameter at depth z and midpoint location Y |
| $l_{zp}(z,Y)$ | ratio of high-frequency P-wave impedance to the background value at depth z and midpoint location Y |
| $l_{zs}(z,Y)$ | ratio of high-frequency S-wave impedance to the background value at depth z and midpoint location Y |
| $l_{vp/vs}(z,Y)$ | ratio of high-frequency $V_p/V_s$ ratio to the background value at depth z and midpoint location Y |
| $l_w(p)$ | P-wave angular factor in the water layer as a function of slowness p |
| $l_p(p,h_w,Y)$ | P-wave angular factor in the mud layer at depth $h_w$ and midpoint location Y as function of slowness p |
| $l_p(p,z,Y)$ | P-wave angular factor at depth z and midpoint location Y as function of slowness p |
| $l_s(p,h_w,Y)$ | S-wave angular factor in the mud layer at depth $h_w$ and midpoint location Y as function of slowness p |
| $l_s(p,z,Y)$ | S-wave angular factor at depth z and midpoint location Y as function of slowness p |
| N | the normal operator |
| Nf | the number of discrete frequency samples after Fourier transformation |
| Nl | one less than the total number of source coefficients which have index values from 0 to Nl |
| Nlayer | the number of layers in the subsurface model |
| Np | the number of slowness values in the data |
| Nt | the number of discrete time samples in the data |
| Nτ | the number of discrete intercept time samples |
| NτY | the number of discrete intercept time samples times the number of midpoints |
| NY | the number of midpoint locations |
| NX | the number of components in the model |
| $P_x$ | x-coordinate location of the detector on the air-water or air-earth interface |
| $P_y$ | y-coordinate location of the detector on the air-water or air-earth interface |
| P | location vector of the detector on the air-water or air-earth interface |
| $P(p,\tau,Y)$ | seismic amplitude for slowness p and intercept τ at midpoint Y |
| $P(p,\tau Y,X)$ | seismic amplitude for slowness p, intercept τ, midpoint Y, and model X |
| $\hat{P}(p,\omega,Y)$ | seismic amplitude for slowness p and intercept ω at midpoint Y |
| $\hat{P}_{vp}(0,\omega,Y)$ | output zero-phase inversion for P-wave velocity reflectivity at frequency ω and midpoint location Y |
| $\hat{P}_{vs}(0,\omega,Y)$ | output zero-phase inversion for S-wave velocity reflectivity at frequency ω and midpoint location Y |
| $\hat{P}_p(0,\omega,Y)$ | output zero-phase inversion for density reflectivity at frequency ω and midpoint location Y |
| $\hat{P}_{zp}(0,\omega,Y)$ | output zero-phase inversion for P-wave impedance reflectivity at frequency ω and midpoint location Y |
| $\hat{P}_{zs}(0,\omega,Y)$ | output zero-phase inversion for S-wave impedance reflectivity at frequency ω and midpoint location Y |
| $\hat{P}_{vp/vs}(0,\omega,Y)$ | output zero-phase inversion for $V_p/V_s$ ratio reflectivity at frequency ω and midpoint location Y |
| $P(p,X)$ | model vector at X of Nτ × NY components at slowness p |
| p | slowness - the ratio of the sine of the reflection angle to the P-wave velocity |
| $P_{max}$ | maximum slowness used as the normalization for source dependence |
| $P_l(\chi)$ | Legendre function of order l evaluated at χ |
| $\phi$ | angle in horizontal plane from 0° to 360° |
| $Q_p(z,Y)$ | background quality factor for P-wave attenuation at depth z and midpoint location Y |
| $Q_{pp}(p,z,Y)$ | summed attenuation for P-wave reflection at depth z and midpoint location Y as a function of slowness p |
| $r_{pp}(p,h_w,Y)$ | P-wave to P-wave reflection coefficient at water bottom at depth $h_w$ and midpoint location Y as a function of slowness p |
| $R_{vp}$ | normal incident reflection factor for P-wave velocity |
| $R_{vs}$ | normal incident reflection factor for S-wave velocity |
| $R_{dn}$ | normal incident reflection factor for density |
| $R_{vp/vs}$ | normal incident reflection factor for $V_p/V_s$ ratio |
| $R_{zp}$ | normal incident reflection factor for P-wave impedance |
| $R_{zs}$ | normal incident reflection factor for S-wave impedance |
| $\rho$ | density |
| $\rho_w$ | density of sea water |
| $\rho(z)$ | density as a function of depth z |

Symbols Table

| Symbol | Description |
| --- | --- |
| $\rho(z,Y)$ | background density as a function of depth z and midpoint location Y |
| $\rho(h_w,Y)$ | background density in the mud layer at depth $h_w$ and midpoint location Y |
| $S_x$ | x-coordinate location of the source on the air-water or air-earth interface |
| $S_y$ | y-coordinate location of the source on the air-water or air-earth interface |
| $S$ | location vector of the source on the air-water or air-earth interface |
| $S(\phi,\theta,t)$ | far-field wavelet at horizontal angle $\phi$, vertical angle $\theta$, and time t |
| $\hat{S}(p,\omega,[\ ],[\ ],Y)$ | source wavelet for slowness p and frequency $\omega$ |
| $\hat{S}_0(\omega)$ | zero phase output source wavelet for frequency $\omega$ |
| $s_l(\tau,[\ ],[\ ],Y_i)$ | source coefficient for source delay $\tau$, order l, at gridded midpoint location $Y_i$ |
| $s$ | collection of all source coefficients |
| $\hat{s}_l(\omega,[\ ],[\ ],Y_i)$ | source coefficient for source frequency $\omega$, order l, at gridded midpoint location $Y_i$ |
| $Taper(\chi)$ | taper for offset $\chi$ |
| $T_{fs}(p,h_w,Y)$ | transmission factor for P-wave propagation through the water bottom at slowness p, depth $h_w$, and midpoint location Y |
| $\theta$ | reflection angle - angle between the reflecting ray and the vertical |
| $t$ | two-way reflection time |
| $t_0$ | zero offset two-way reflection time |
| $t(\chi)$ | two-way reflection time as a function of source to detector distance $\chi$ |
| $\tau$ | intercept time |
| $\tau_j$ | the j-th discrete intercept time |
| $\tau(p)$ | intercept time for a reflection as a function of slowness p |
| $\tau(0)$ | intercept time for a reflection at zero slowness |
| $\tau_1(p)$ | intercept time for a first reflection event as a function of slowness p |
| $\tau_2(p)$ | intercept time for a second reflection event as a function of slowness p |
| $\tau_n(p)$ | intercept time for the n-th reflection as a function of slowness p |
| $\tau_{pp}(p,z,Y)$ | intercept arrival time at slowness p for P-wave to P-wave reflection from depth z and midpoint location Y |
| $U$ | upper depth location |
| $V_2$ | P-wave velocity of the layer beneath the water bottom |
| $V_n$ | P-wave velocity of the layer above the nth reflector |
| $V_p$ | P-wave velocity |
| $V_p^{background}$ | the background P-wave velocity |
| $V_p(z)$ | P-wave velocity as a function of depth z |
| $V_p(z,Y)$ | background P-wave velocity as a function of depth z and midpoint location Y |
| $V_s$ | S-wave velocity |
| $V_s(z)$ | S-wave velocity as a function of depth z |
| $V_s(z,Y)$ | background S-wave velocity as a function of depth z and midpoint location Y |
| $V_{nmo}$ | P-wave normal moveout velocity |
| $V_{mig}$ | P-wave migration velocity |
| $V_{int}$ | P-wave interval velocity |
| $V_{Dix}$ | P-wave Dix approximation interval velocity |
| $V_w$ | P-wave velocity of sea water |
| $W(p,\tau,Y)$ | least squares weight for slowness p, intercept $\tau$, and midpoint location Y |
| $W(p)$ | least squares weight for slowness p as a matrix |
| $W^\tau(p)$ | transpose of the least-squares weight matrix at slowness p |
| $w(p,z,Y)$ | inverse of the least-squares weight for slowness p, depth z, and midpoint location Y |
| $wt(Y)$ | source weight function used to smooth midpoints |
| $\omega$ | frequency in radians per second |
| $\omega_0$ | the low end of the seismic frequency range in radians per second |
| $\omega_i$ | the i-th discrete frequency value in radians per second |
| $\chi$ | non-negative source to detector distance |
| $\chi_{pp}(p,h_w,Y)$ | arriving offset of reflecting P-wave for slowness p from depth $h_w$ and midpoint location Y |
| $\chi_{pp}(p,z,Y)$ | arriving offset of reflecting P-wave for slowness p from depth z and midpoint location Y |
| $X$ | vector containing all model variables |
| $X_0$ | vector containing all model variables at some initial location in model space |
| $y_{pp}(p,z,Y)$ | P-wave to P-wave integrated reflection factor for slowness p from depth z and midpoint location Y |
| $Y_x$ | x-coordinate location of the midpoint on the air-water or air-earth interface |
| $Y_y$ | y-coordinate location of the midpoint on the air-water or air-earth interface |
| $Y$ | location vector of the midpoint on the air-water or air-earth interface |
| $Z_p$ | P-wave impedance, density times P-wave velocity |
| $Z_p(z,Y)$ | P-wave impedance at depth z and midpoint location Y |
| $Z_c(p,h_w,Y)$ | P-wave impedance in the mud layer for slowness p and midpoint location Y |
| $Z_w(P)$ | P-wave impedance in the water layer for slowness p |
| $Z_s$ | S-wave impedance, density times S-wave velocity |
| $z$ | depth from air-earth or air-water interface |
| $|z|$ | complex absolute value |
| $z_r$ | real part of the complex number z |
| $z_i$ | imaginary part of the complex number z |
| $i,j,k,l,n$ | integer counters when used as subscripts |

We claim:

1. A method for deriving the lithology and fluid content at a subsurface target location from pre-stack seismic reflection data obtained at both said subsurface target location and a subsurface calibration location having known lithology and fluid content, said method comprising the steps of:

(a) creating computer models of said subsurface target and calibration locations;

(b) selecting a set of elastic parameters representative of said known lithology and fluid content at said subsurface calibration location;

(c) performing an inversion of said pre-stack seismic reflection data to determine the values of said set of elastic parameters at each of a plurality of points in said models of said subsurface target and calibration locations;

(d) comparing relative magnitudes of said elastic parameter values for said subsurface target and calibration locations; and (e) using the results of said comparison and said known lithology and fluid content at said subsurface calibration location to derive said lithology and fluid content at said subsurface target location.

2. The method of claim 1, wherein said elastic parameters are selected from the group consisting of the elastic reflection factors for P-wave velocity, S-wave velocity, density, P-wave impedance, S-wave impedance, and ratio of P-wave velocity to S-wave velocity.

3. The method of claim 2, wherein said step of comparing relative magnitudes of said elastic parameters comprises comparing ratios of any two of said elastic reflection factors for both said subsurface target and calibration locations.

4. The method of claim 1, wherein said models comprise a series of plane, parallel layers and wherein said inversion is a viscoelastic inversion in the slowness-intercept time (p-$\tau$) domain.

5. The method of claim 1 wherein said inversion is a viscoelastic inversion in the offset-time (x-t) domain.

6. The method of claim 1, wherein said method further comprises the step of pre-processing said pre-stack seismic reflection data to remove unnecessary noises and to determine a model of the P-wave interval velocity for both said subsurface target and calibration locations for use in said inversion.

7. The method of claim 6, wherein said pre-processing includes performing a migration of said pre-stack seismic data to remove diffraction hyperbolas and to correctly position dipping reflectors.

8. The method of claim 7, wherein said migration is a time migration.

9. The method of claim 7, wherein said migration is a depth migration.

10. The method of claim 7, wherein said pre-processing further includes conducting calibration tests to verify that said migration produces the correct dependence of reflection amplitude on reflection angle.

11. The method of claim 1, wherein said method further comprises the steps of:

(f) repeating steps (a) through (e) for a plurality of subsurface locations to develop a data base of subsurface elastic parameters and the associated lithologies and fluid contents;

(g) obtaining pre-stack seismic reflection data for another subsurface target location having unknown lithology and fluid content;

(h) performing an inversion of said pre-stack seismic reflection data to determine a plurality of elastic parameters representative of said unknown lithology and fluid content at said another subsurface target location; and (I) using the results of said inversion and said data base to predict the lithology and fluid content at said another subsurface target location.

12. A method for deriving the subsurface lithology and fluid content at a target location, said method comprising the steps of:

(a) selecting a calibration location having a well drilled thereon;

(b) obtaining wellbore measurements from said well and determining the subsurface lithology and fluid content at said calibration location from said wellbore measurements;

(c) obtaining pre-stack seismic reflection data for both said target and calibration locations;

(d) creating computer models of the subsurface at both said target and calibration locations;

(e) selecting a set of elastic parameters representative of said subsurface lithology and fluid content at said calibration location, said set of elastic parameters being selected from the group consisting of the elastic reflection factors for P-wave velocity, S-wave velocity, density, P-wave impedance, S-wave impedance, and ratio of P-wave velocity to S-wave velocity;

(f) performing an inversion of said pre-stack seismic reflection data to determine the values of said set of elastic parameters at each of a plurality of points in said models of the subsurface at said target and calibration locations;

(g) comparing relative magnitudes of said elastic parameter values for said target and calibration locations; and (h) deriving said subsurface lithology and fluid content at said target location from the results of said comparison and said subsurface lithology and fluid content at said calibration location.

13. The method of claim 12, wherein said method further comprises performing a transformation of said pre-stack seismic reflection data to the slowness-intercept time (p-$\tau$) domain, and wherein said inversion is a viscoelastic inversion in the p-$\tau$ domain.

14. The method of claim 12, wherein said inversion is a viscoelastic inversion in the offset-time (x-t) domain.

15. The method of claim 12, wherein said method further comprises the step of pre-processing said pre-stack seismic reflection data to remove unnecessary noises and to determine a model of the subsurface P-wave interval velocity for both said target and calibration locations for use in said inversion.

16. The method of claim 15, wherein said step of pre-processing said pre-stack seismic reflection data includes performing a migration of said pre-stack seismic reflection data to remove diffraction hyperbolas and to correctly position dipping reflectors.

17. The method of claim 16, wherein said migration is a time migration.

18. The method of claim 16, wherein said migration is a depth migration.

19. The method of claim 16, wherein said step of pre-processing said pre-stack seismic reflection data further includes conducting calibration tests to verify that said migration produces the correct dependence of reflection amplitude on reflection angle.

20. The method of claim 12, wherein said step of comparing relative magnitudes of said elastic parameters comprises comparing ratios of any two of said elastic reflection factors for both said target and calibration locations.

21. The method of claim 13, wherein said transformation to the p-$\tau$ domain includes a layer-stripping process to determine the seismic interval velocity model for use in said inversion.

22. The method of claim 12, wherein said inversion is a damped, least-squares inversion.

23. The method of claim 12, wherein said inversion comprises the steps of:

(i) obtaining a background velocity model, an initial estimate of the P-wave quality factor, and an initial wavelet estimate for said pre-stack seismic reflection data, (ii) using said background velocity model, said initial estimate of the P-wave quality factor, and said initial wavelet estimate to perform an inversion of said pre-stack seismic reflection data to obtain a refined wavelet, and (iii) using said refined wavelet to perform an inversion of said pre-stack seismic reflection data to estimate said elastic reflection factors at midpoint locations of interest over said target and calibration locations.

24. The method of claim 23, wherein data collection parameters for said pre-stack seismic reflection data are known, and said initial wavelet estimate is computed from said known data collection parameters.

25. The method of claim 23, said method further comprising the step of recording the output source signature during collection of said pre-stack seismic reflection data, and wherein said initial wavelet estimate is based on said recorded source signature.

26. The method of claim 23, wherein said inversion to obtain a refined wavelet uses an alternation process to alternate between reflectivity inversion at fixed wavelet and wavelet inversion at fixed reflectivity.

27. The method of claim 12, wherein said step of comparing relative magnitudes of said elastic parameters comprises selecting a normalization factor and normalizing each of said elastic parameters using said normalization factor.

28. The method of claim 27, wherein said normalization factor is P-wave velocity.

29. The method of claim 27, wherein said normalization factor is P-wave impedance.

30. The method of claim 12, wherein said method further comprises the steps of:

(i) repeating steps (a) through (h) for a plurality of locations to develop a data base of elastic parameters and the associated subsurface lithologies and fluid contents;

(j) obtaining pre-stack seismic reflection data for another target location having unknown subsurface lithology and fluid content;

(k) performing an inversion of said pre-stack seismic reflection data to determine a plurality of elastic parameters representative of said unknown subsurface lithology and fluid content at said another target location; and (l) using the results of said inversion and said data base to predict the subsurface lithology and fluid content at said another target location.

31. A method for analyzing pre-stack seismic reflection data for a subsurface target location to determine the presence or absence of significant hydrocarbon accumulations in said subsurface target location, comprising the steps of:

(a) obtaining pre-stack seismic reflection data for a subsurface calibration location having a known hydrocarbon saturation;

(b) creating computer models of both said subsurface target location and said subsurface calibration location;

(c) selecting a set of elastic parameters representative of said known hydrocarbon saturation at said subsurface calibration location, said set of elastic parameters being selected from the group consisting of the elastic reflection factors for P-wave velocity, S-wave velocity, density, P-wave impedance, S-wave impedance, and ratio of P-wave velocity to S-wave velocity;

(d) performing an inversion of said pre-stack seismic reflection data for both said subsurface target location and said subsurface calibration location to determine arithmetic values of said selected set of elastic parameters at each of a plurality of points in said computer models of said subsurface target and calibration locations; and (e) comparing said arithmetic vales of said selected elastic parameters at said subsurface target and calibration locations, together with said known hydrocarbon saturation at said subsurface calibration location, to predict the hydrocarbon saturation at said subsurface target location.

32. The method of claim 31, wherein said step of comparing arithmetic values of said selected elastic parameters comprises comparing ratios of any two of said parameters for both said target and calibration locations.

33. The method of claim 31, wherein said step of comparing arithmetic values of said selected elastic parameters comprises selecting a normalization factor and normalizing each of said elastic parameters using said normalization factor.

34. The method of claim 33, wherein said normalization factor is P-wave velocity.

35. The method of claim 33, wherein said normalization factor is P-wave impedance.

* * * * *